United States Patent [19]
Matsumoto

[11] Patent Number: 5,848,390
[45] Date of Patent: Dec. 8, 1998

[54] SPEECH SYNTHESIS SYSTEM AND ITS METHOD

[75] Inventor: Tatsuro Matsumoto, Kawasaki, Japan

[73] Assignee: Fujitsu Limited, Kanagawa, Japan

[21] Appl. No.: 382,531

[22] Filed: Feb. 2, 1995

[30] Foreign Application Priority Data

Feb. 4, 1994 [JP] Japan ................................. 6-012492

[51] Int. Cl.⁶ ..................................................... G10L 5/02
[52] U.S. Cl. ........................... 704/260; 704/258; 704/270
[58] Field of Search ................................ 381/51, 52, 53;
395/2.14, 2.16, 2.38, 2.39, 2.44, 2.67, 2.69,
2.7, 2.77, 2.79, 2.82, 2.84; 704/205, 207,
229, 236, 235, 258, 260, 261, 268, 270,
273, 275

[56] References Cited

U.S. PATENT DOCUMENTS

| | | | |
|---|---|---|---|
| 4,331,836 | 5/1982 | Wiggins et al. | 385/51 |
| 4,438,523 | 3/1984 | Brandl | 375/30 |
| 4,538,234 | 8/1985 | Honda et al. | 395/2.38 |
| 4,581,757 | 4/1986 | Cox et al. | 395/2.67 |
| 4,592,070 | 5/1986 | Chow et al. | 375/27 |
| 4,618,936 | 10/1986 | Shiono | 395/2.69 |
| 4,623,970 | 11/1986 | Toyomura | 395/2.7 |
| 4,624,012 | 11/1986 | Lin et al. | 395/2.7 |
| 4,692,941 | 9/1987 | Jacks et al. | 381/52 |
| 4,709,340 | 11/1987 | Capizzi | 364/513.5 |
| 4,783,808 | 11/1988 | Doddington et al. | 395/2.45 |
| 4,821,027 | 4/1989 | Mallory et al. | 395/2.77 |
| 4,852,168 | 7/1989 | Sprague et al. | 381/35 |
| 5,418,717 | 5/1995 | Su et al. | 359/759 |
| 5,481,645 | 1/1996 | Bertino et al. | 395/2.79 |
| 5,504,832 | 4/1996 | Taguchi | 395/2.1 |
| 5,511,000 | 4/1996 | Kaloi et al. | 395/2.1 |

*Primary Examiner*—David R. Hudspeth
*Assistant Examiner*—Michael N. Opsasnick
*Attorney, Agent, or Firm*—Staas & Halsey

[57] ABSTRACT

A speech synthesis system has a word lexicon stored in a storage device for managing word information, a speech lexicon stored in the storage device for managing speech data. A language processing module carries out language processing of an input text by using the word information, and an acoustic processing module generates a synthesized speech signal by using the speech data in response to a processing result of the language processing module. A D/A converter converts the synthesized speech signal to an analog signal. The system further includes a detection module detecting performance or conditions of a hardware part of a computer in which the system is implemented, and an adjustment module adjusting the word information and/or the speech data which are to be given to the language processing module and the acoustic processing module, based on a detection result of the detection module. Therefore, an optimum speech-synthesis processing suitable for any computer is performed.

34 Claims, 31 Drawing Sheets

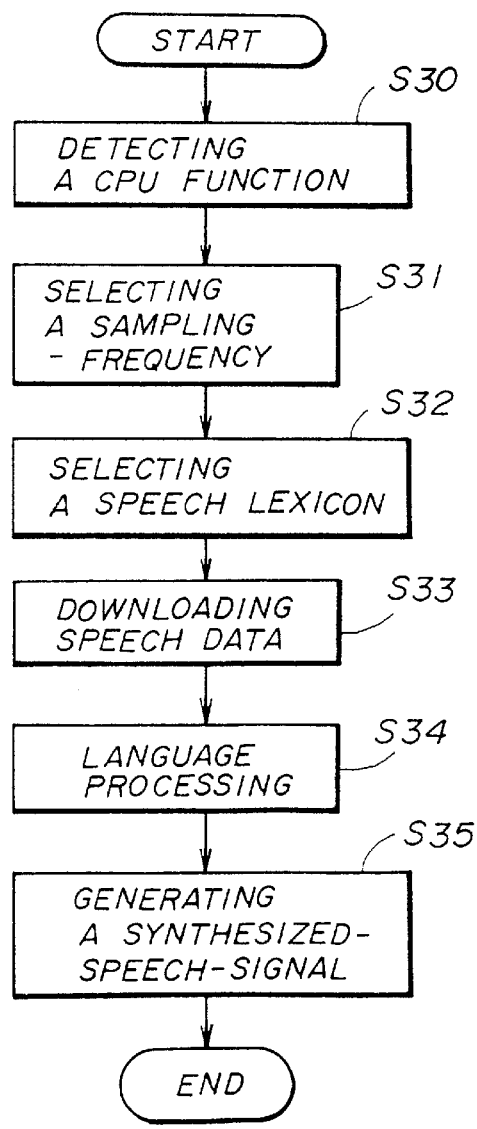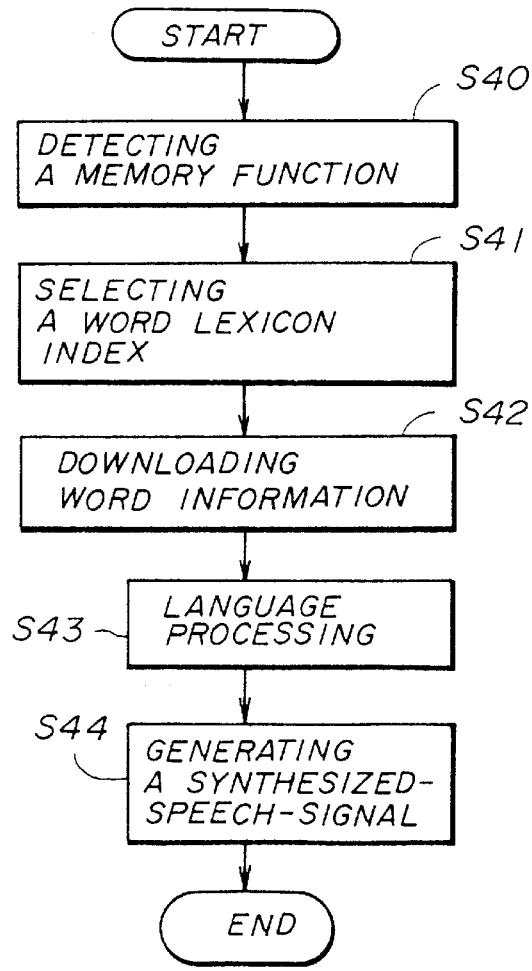

SPEECH SYNTHESIS SYSTEM AND ITS METHOD

BACKGROUND OF THE INVENTION

1. Field of the Invention

The present invention generally relates to a speech synthesis system and its method for generating a synthesized speech signal of an input text, and more particularly, to a speech synthesis system and its method in which a speech-synthesis processing suitable for a computer use can be realized.

2. Description of the Prior Art

FIG. 1 shows a whole configuration of a prior art of a computer-implemented speech synthesis system.

In general, the speech synthesis system is constructed with a given computer equipped with a D/A converter 5, in which a speech-synthesis processing part is installed as the software. And the speech synthesis system also comprises a word lexicon 1 storing word information such as a representation, a pronunciation, an accent, and part-of-speech information of words, and a speech lexicon 2 storing speech data such as a speech waveform or speech parameters (e.g. PARCOR factors which characterize a speech) each synthesizing part of words. The word lexicon 1 and the speech lexicon 2 are represented with second-order storing devices for which CD-ROMs or hard disks are commonly used.

The speech-synthesis processing part as the software comprises a language processing module 3 and an acoustic processing module 4. The language processing module 3, which carries out the language processing for the speech synthesis, includes a morphological analysis module 10, a dependency analysis module 11, and a prosodic-symbol generating module 12. The acoustic processing module 4, which generates a synthesized speech signal, includes a duration decision module 14, a fundamental-frequency-pattern generating module 15, and a waveform generating module 16. The language processing module 3 also includes a word lexicon buffer 13, which temporarily stores a whole or a part of the word lexicon 1. The acoustic processing module 4 also includes a speech lexicon buffer 17, which temporarily stores a whole or a part of the speech lexicon 2. The word lexicon buffer 13 and the speech lexicon buffer 17 are represented with firstorder storing devices for which random access memories (RAM) are commonly used.

The D/A converter 5 is hardware-constructed to convert a digital signal of the synthesized speech signal generated in the acoustic processing module 4 to an analog signal.

Next, an operation will be given of the conventional speech synthesis system.

First, the morphological analysis module 10 analyzes a morpheme (word) which is a minimum unit in an input text, in order to decide the pronunciation of the word and to obtain its accent and part-of-speech information, while referring to the word information in the word lexicon buffer 13, which is derived from the word lexicon 1.

Second, the dependency analysis module 11 analyzes a dependency (modification) relation in each phrase from the information such as part-of-speech information obtained in the morphological analysis module 10.

Third, the prosodic-symbol generating module 12 generates prosodic symbols indicating the accent and breathers, to finally decide locations of the accent of the words by using the accent information and an accent connection rule of each word, and to decide locations of the breathers by using the dependency information of the phrase.

Forth, the duration decision module 14 decides a duration of each syllable (phoneme) corresponding to the pronunciation.

Fifth, the fundamental-frequency-pattern generating module 15 generates a time variation pattern of a fundamental frequency which is a physical value to indicate an intonation and the accent, from the prosodic symbols.

Sixth, the waveform generating module 16 reads out speech data associated with the syllable (phoneme) to be synthesized, from the speech data in the speech lexicon buffer 17 derived from the speech lexicon 2, and generates the synthesized speech signal based on the duration and the fundamental frequency pattern.

And finally, the D/A converter 5 converts the synthesized speech signal generated in the waveform generating module 16 to produce the analog audible signal.

In the speech synthesis system having such a configuration, there is a need for the computer having a hardware performance to realize practical speech synthesis characteristics (processing speed and a speech quality level). In order to realize the practical speech synthesis characteristics, a number of the words stored in the word lexicon 1 is required to increase, and further a sampling frequency and a number of quantization levels of the speech data stored in the speech lexicon 2 are required to increase. Also needed is the D/A converter 5 applicable for such improved characteristics.

Therefore, according to the prior art, when a user constructs the speech synthesis system, the user has to select the computer having the hardware performance which is required by the speech synthesis system. However, the user desires that the software of the speech synthesis system be operable in the computer being commonly used by the user.

In addition, to meet different users' requirements, manufacturers also have to fabricate a plurality of software capable of realizing a variety of speech-synthesis characteristic levels with relation to the hardware performance of the different users' computers.

SUMMARY OF THE INVENTION

It is an object of this invention to provide a speech synthesis system and its method which is capable of realizing a speech-synthesis processing suitable for any computer in which software is run, in which the disadvantages described above are eliminated.

The object described above is achieved by a speech synthesis system having a word lexicon stored in a storage device for managing word information, a speech lexicon stored in the storage device for managing speech data, a language processing module carrying out language processing on an input text by using the word information, an acoustic processing module generating a synthesized speech signal by using the speech data in response to a processing result of the language processing module, and a D/A converter converting the synthesized speech signal to an analog signal, the system comprising: a detection module detecting performance or conditions of a hardware part of a computer in which the system is implemented; and an adjustment module adjusting the word information and/or the speech data which are to be given to the language processing module and the acoustic processing module, based on a detection result of the detection module; wherein a speech-synthesis processing suitable for any computer is performed.

The object described above is also achieved by the speech synthesis system mentioned above, wherein the detection module comprises a portion or a whole of: a CPU-function detection module detecting CPU performance or CPU load; a memory-function detection module detecting memory capacity or memory using situation; a storage-device-function detection module detecting access performance of the storage device; and a D/A-converter-function detection module detecting D/A converting performance of the D/A converter.

The object described above is further achieved by the speech synthesis system mentioned above, further comprising a bit adjustment module adjusting bit data of the synthesized speech signal generated in the acoustic processing module according to a number of quantization bits of the D/A converter detected by the D/A-converter-function detection module, when the number of the quantization bits of the D/A converter is not identical to a number of quantization bits of the synthesized speech signal generated in the acoustic processing module.

In addition, the object described above is achieved by the speech synthesis system mentioned above, further comprising a frequency adjustment module adjusting a sampling frequency of the synthesized speech signal generated in the acoustic processing module according to a sampling frequency of the D/A converter detected by the D/A-converter-function detection module, when the sampling frequency of the D/A converter is not identical to a sampling frequency of the synthesized speech signal generated in the acoustic processing module.

The object described above is further achieved by the speech synthesis system mentioned above, wherein the adjustment module adjusts the speech data for the acoustic processing module, by using means of adjusting a number of quantization bits of the speech data, adjusting a sampling frequency of the speech data, adjusting an amount of supply of the speech data, or combinations thereof.

And the above speech synthesis system is also constructed with a setting module by which a user can set performance or conditions of a hardware part of a computer in which the system is implemented, with a dialogic processing between the user and the computer, instead of the detection module.

According to the speech synthesis system, according to the hardware performance or conditions detected in the detection module, the word information directed to the language processing module is adjusted, and the number of the quantization bits, the sampling frequency, and the amount of supply of the speech data directed to the acoustic processing module are adjusted.

By such adjustment, with the computer having high hardware performance, the language processing module and the acoustic processing module may perform superior speech-synthesis processing, and with the computer having poor hardware performance, these modules may perform optimum speech-synthesis processing in the range of that hardware performance.

In this way, according to the speech synthesis system, the speech-synthesis processing suitable for any computer in which software is run, may be realized. Thus, the user may construct a good speech synthesis system with the computer which has been used by the user.

Other objects and further features of the present invention will be apparent from the following detailed description when read in conjunction with the accompanying drawings.

BRIEF DESCRIPTION OF THE DRAWINGS

FIG. 32 shows an example of the procedure embodiment of the speech synthesizing method according to the present invention; and FIG. 33 shows another example of the procedure embodiment of the speech synthesizing method according to the present invention.

DESCRIPTION OF THE PREFERRED EMBODIMENTS

Figure 1:
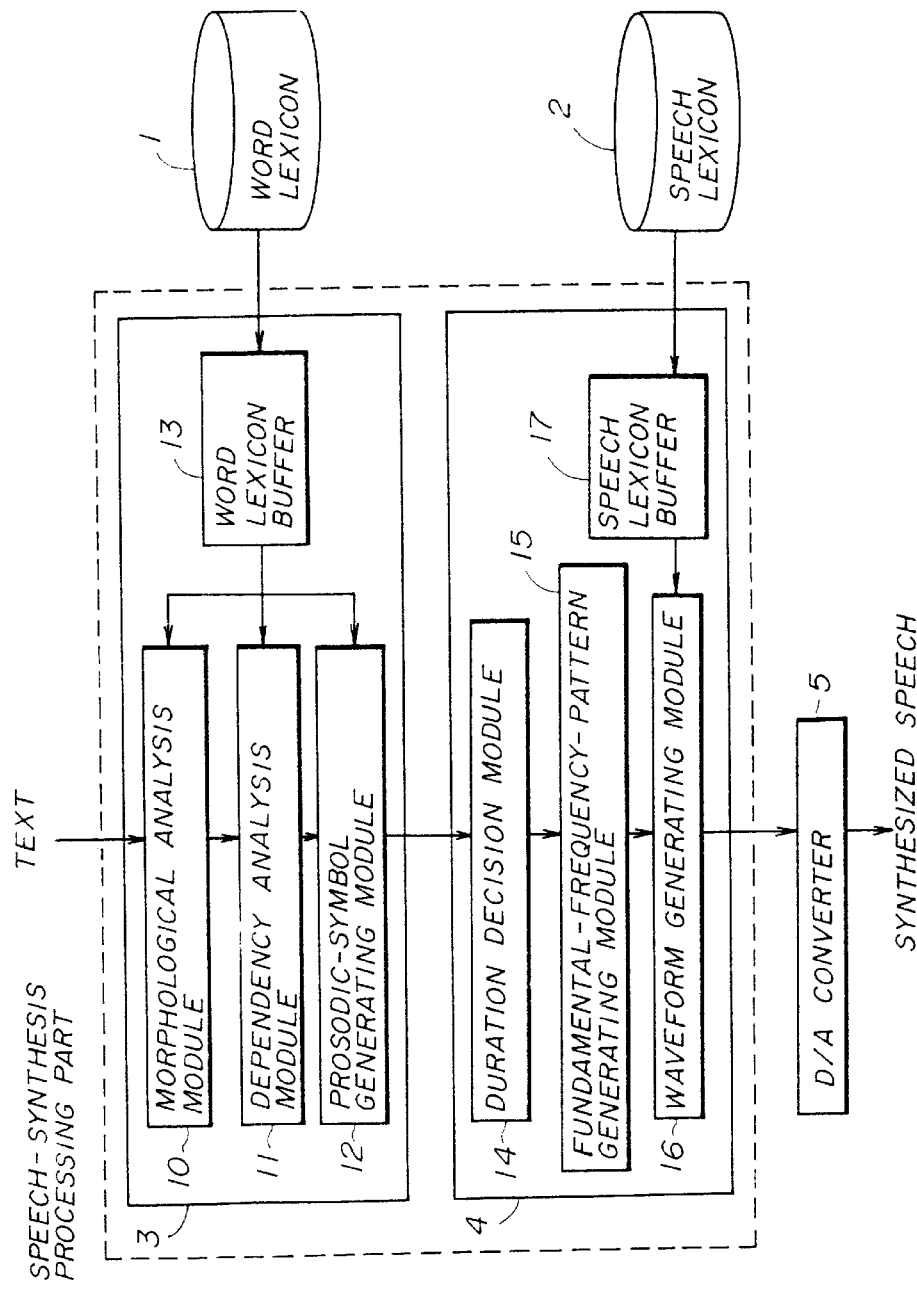
FIG. 1 shows a whole configuration of a prior art of a computer-implemented speech synthesis system.
Figure 2:
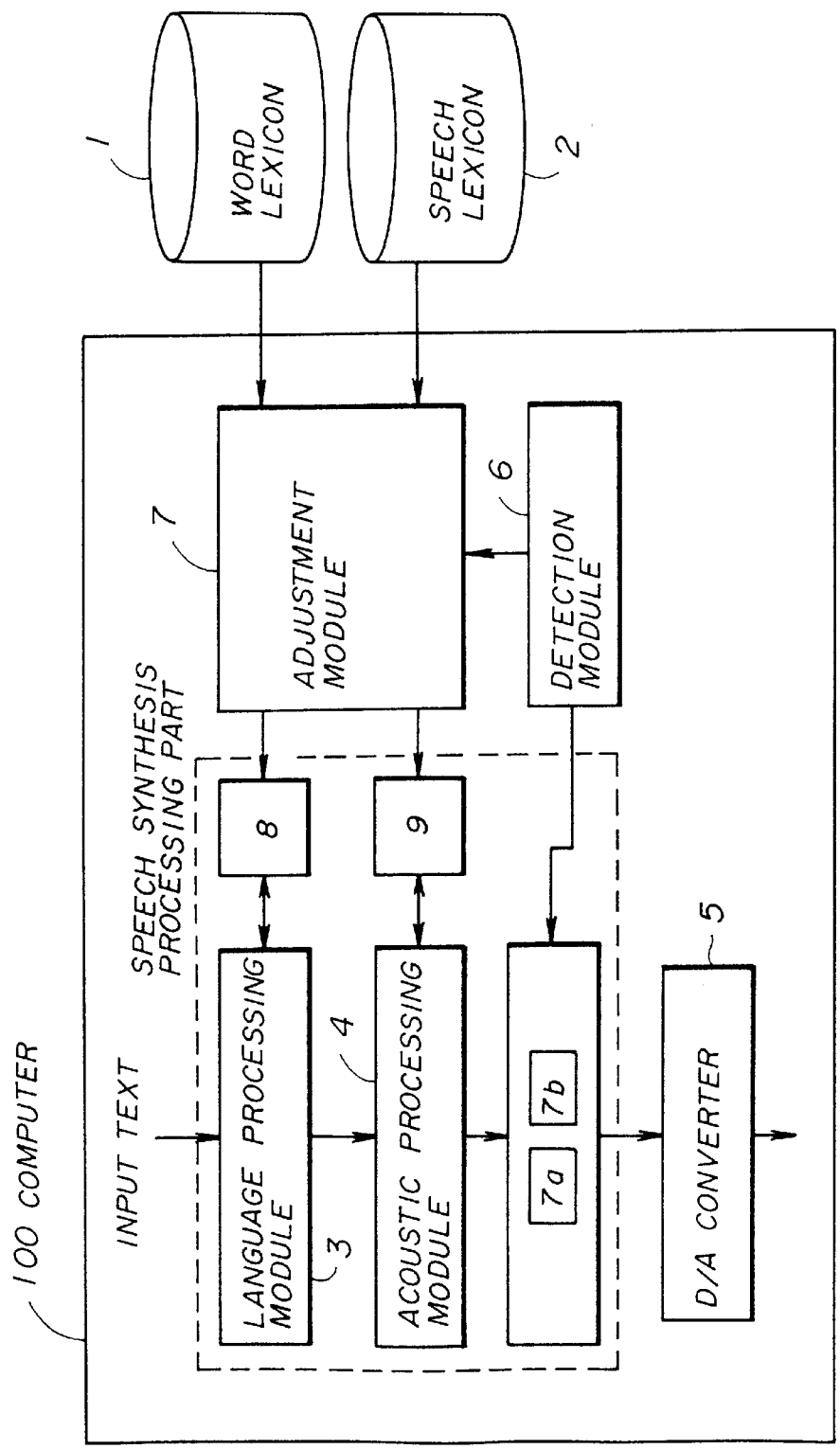
FIG. 2 shows a basic configuration for explaining a principle of the speech synthesis system according to the present invention.

First, a description will be given of a principle of a speech synthesis system according to the present invention, by referring to FIG. 2. FIG. 2 shows a basic configuration for explaining the principle of the speech synthesis system according to the present invention. This speech synthesis system comprises a computer 100 in which a software for the speech synthesis system is installed, a word lexicon 1 managing word information, and a speech lexicon 2 managing speech data necessary for the speech-synthesis processing (e.g. successive data of 48 kHz×16 bits). The word lexicon 1 and the speech lexicon 2 are stored in a second-order storage device equipped with the computer 100. In general, a CD-ROM or a hard disk is used as the second-order storage device.

The computer 100 comprises a language processing module 3, an acoustic processing module 4, a D/A converter 5, a detection module 6, an adjustment module 7, a bit adjustment module 7a, a frequency adjustment module 7b, a word-information storage area 8, and a speech-data storage area 9, to construct the speech synthesis system.

The language processing module 3 receives an input text, and performs a language processing for the speech synthesis by using the word information data which is managed by the word lexicon 1. The acoustic processing module 4 receives a processing result of the language processing module 3, and generates a synthesized speech signal of the input text by using the speech data which is managed by the speech lexicon 2. The D/A converter 5 converts the synthesized speech signal generated in the acoustic processing module to an analog audible signal.

The detection module 6 detects performance and conditions of the computer hardware in which the system's software is run. The detection module 6 comprises a portion or a whole of a CPU-function detection module detecting CPU performance or CPU load, a memory-function detection module detecting memory capacity or memory-using situation, a second-order-storage-device-function detection module detecting access performance of the second-order storage device, and a D/A-converter-function detection module detecting D/A converting performance of the D/A converter 5.

The adjustment module 7 adjusts lexicon information directed to the language processing module 3 and the acoustic processing module 4 according to detecting results of the detection module 6. The bit adjustment module 7a, connected with an output of the acoustic processing module 4, adjusts bit data of the synthesized speech signal generated in the acoustic processing module 4 according to a detection result of the D/A-converter-function detection module of the detection module 6. The frequency adjustment module 7b, also connected with the output of the acoustic processing module 4, adjusts a sampling frequency of the synthesized speech signal generated in the acoustic processing module 4 according to the detection result of the D/A-converter-function detection module of the detection module 6.

The word-information storage area 8 stores the word information adjusted by the adjustment module 7. This word information stored in the wordinformation storage area 8 is accessed by the language processing module 3. The speech-data storage area 9 stores the speech data adjusted by the adjustment module 7. This speech data stored in the speech-data storage area 9 is accessed by the acoustic processing module 4.

In this system, the detection module 6 detects the CPU performance or the CPU load by the CPU-function detection module, detects the memory capacity or the memory-using situation by the memory-function detection module, detects the access performance of the second-order storage device by the second-order-storage-device-function detection module, or detects quantization performance and frequency performance of the D/A converter 5 by the D/A-converter-function detection module.

When the detection module 6 detects the performance or the conditions of the hardware of the computer 100, and the detection result is, for example, sufficient memory, the adjustment module 7 reads out a large number of the word information from the word lexicon 1 to store in the word-information storage area 8. In this way, the word information is adjusted by the detection result. If the detection result is sufficient CPU performance, the speech data stored in the speech lexicon 2 is sampled in a high frequency to store it in the speech-data storage area 9. In this way, according to the detection result, a number of quantization bits of the speech data is adjusted to store it in the speech-data storage area 9, a sampling frequency of the speech data is adjusted to store it in the speech-data storage area 9, or an amount of supply of the speech data is adjusted to store it in the speech-data storage area 9. Or, by using combinations thereof, the speech data directed to the acoustic processing module 4 is adjusted.

The bit adjustment module 7a adjusts bit data of the synthesized speech signal generated in the acoustic processing module 4 according to a number of quantization bits of the D/A converter 5 detected by the D/A-converter-function detection module, when the number of the quantization bits of the D/A converter 5 is not identical to the number of the quantization bits of the synthesized speech signal generated in the acoustic processing module 4.

The frequency adjustment module 7b adjusts the sampling frequency of the synthesized speech signal generated in the acoustic processing module 4 according to a sampling frequency of the D/A converter detected by the D/A-converter-function detection module, when the sampling frequency of the D/A converter is not identical to the sampling frequency of the synthesized speech signal generated in the acoustic processing module 4.

By such adjustment, with the computer having high hardware performance, the language processing module 3 and the acoustic processing module 4 may perform superior speech-synthesis processing, and with the computer having poor hardware performance, these modules 3, 4 may perform optimum speech-synthesis processing in the range of that hardware performance.

Figure 3:
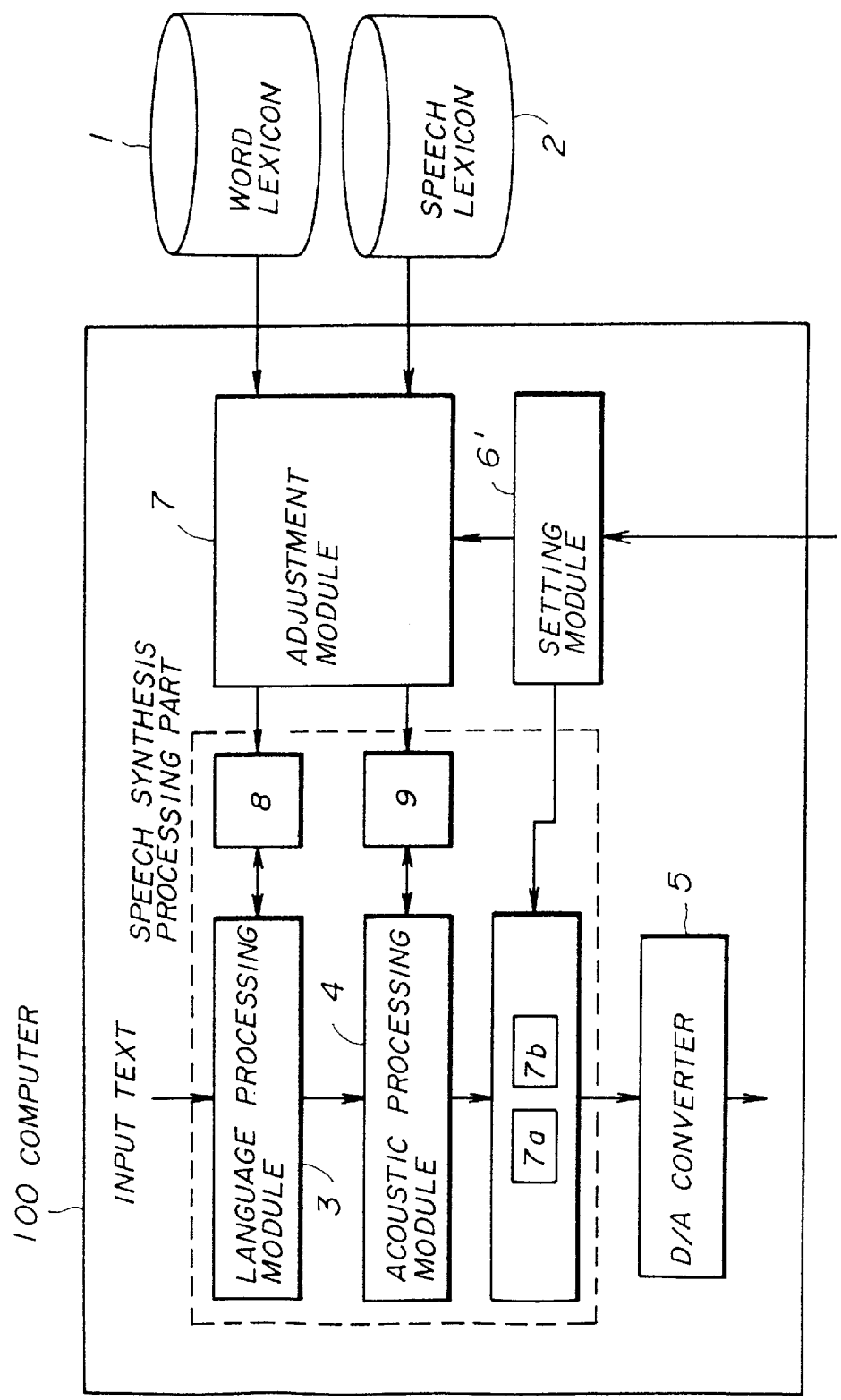
FIG. 3 shows a basic configuration for explaining a principle of another speech synthesis system according to the present invention.

And, FIG. 3 shows a basic configuration for explaining a principle of another speech synthesis system according to the present invention. A configuration of this system is almost similar to that of the system in FIG. 2, but a setting module 6' is installed in the computer instead of the detection module 6. By using the setting module 6', a user can set the performance or conditions of the hardware part of the computer 100, with a dialogic processing between the user and the computer 100. Other operations are the same as the system of FIG. 2. In this system, there is a flexibility that the performance or the conditions of the computer hardware may be adjusted by the user.

Next, descriptions will be given of embodiments of the speech synthesis system according to the present invention, by referring to FIGS. 4 to 7. FIGS. 4 to 7 show examples of configurations of the speech synthesis system in the case that a CPU-function detection module 60 is used in the detection module 6. A block shown as a reference numeral 90 represents a data buffer corresponding to the speech-data storage area 9.

The CPU-function detection module 60 detects the CPU performance or the CPU load by means of, for example, running a test program and detecting its running time. Or the module 60 detects the CPU performance of a 32-bit machine by querying it to an operating system. These detecting results are processed to be represented with given levels.

Figure 4:
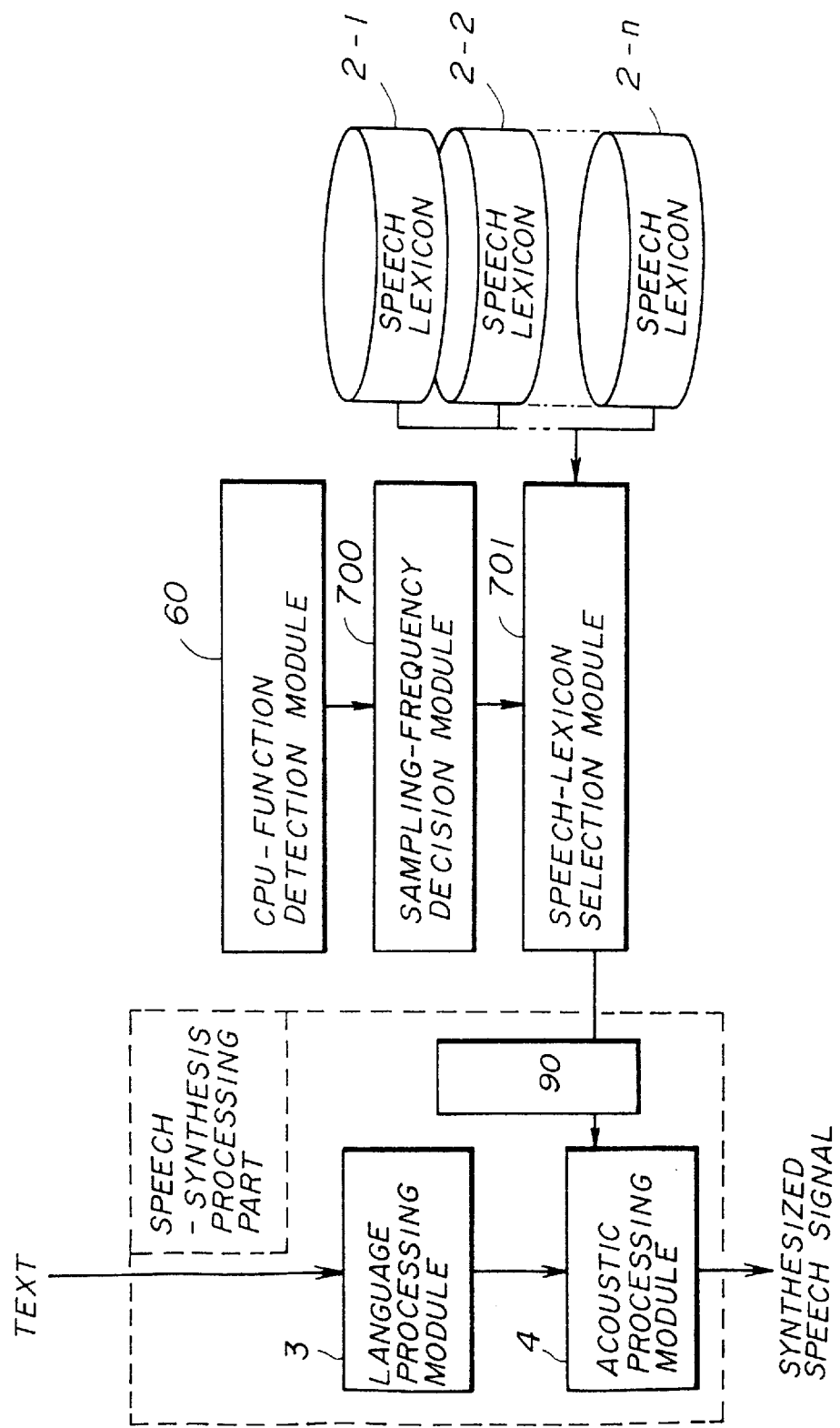
FIGS. 4 to 7 show examples of configurations of the speech synthesis system in a case that a CPUfunction detection module 60 is used in a detection module 6 in FIG. 2.

In the embodiment of FIG. 4, the system includes a plurality of speech lexicons 2-i (i=1 to n) which manage the speech data having different sampling frequencies. And the adjustment module 7 consists of a sampling-frequency decision module 700 and a speech-lexicon selection module 701.

In the embodiment of FIG. 4 constructed in such a structure, once the CPU-function detection module 60 detects the CPU performance or the CPU load, and produces the level of the detection result, the sampling-frequency decision module 700 decides the sampling frequency of the speech data based on the level detected in the CPU-function detection module 60. For example, when the detection result of the level which indicates high CPU performance is given from the CPU-function detection module 60, the sampling-frequency decision module 700 decides to use the speech data having a high sampling frequency such as 48 kHz because of the high processing performance, whereas when the detection result of the level which indicates low CPU performance is given, the module 700 decides to use the speech data having a low sampling frequency such as 8 kHz because of the low processing performance.

And subsequently, the speech-lexicon selection module 701 receives the decision result of the sampling-frequency decision module 700, and reads out the speech data from the speech lexicon 2-i which manages the speech data having a decided sampling frequency, the speech data read out being stored in the speech-data buffer 90.

Thus, in the embodiment of FIG. 4, by means of changing the sampling frequency of the speech data stored in the speech-data buffer 90 based on the CPU performance, the speech-synthesis processing suitable for the CPU performance may be realized by adjusting the amount of the speech data directed to the acoustic processing module 4.

Figure 5:
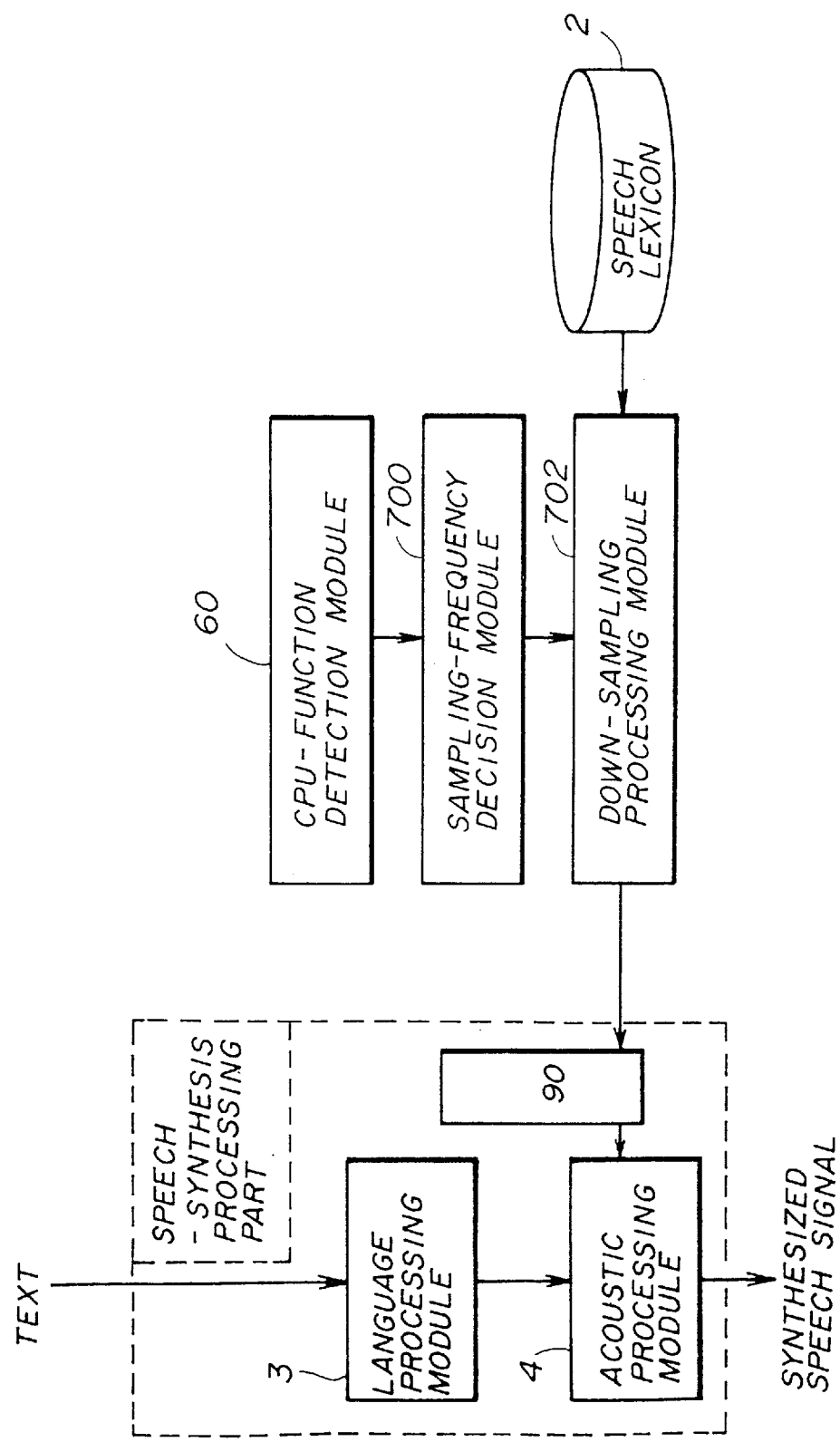

On the other hand, in the embodiment of FIG. 5, the system includes the single speech lexicon 2 which manages the speech data having the high sampling frequency of, for example, 48 kHz. The adjustment module 7 consists of the sampling-frequency decision module 700 and a down-sampling processing module 702.

In the embodiment of FIG. 5, once the CPU-function detection module 60 detects the CPU performance or the CPU load, and produces the level of the detection result, the sampling-frequency decision module 700 decides the sampling frequency of the speech data based on the value of the level, as described above.

And subsequently, the down-sampling processing module 702 receives the decision result of the sampling-frequency decision module 700, and derives the speech data from the speech lexicon to store it in the speech-data buffer 90 in a suitable sampling-frequency. For example, when the sampling-frequency decision module 700 decides the high sampling frequency such as 48 kHz, the down-sampling processing module 702 reads out directly the speech data stored in the speech lexicon 2, and stores it in the speech-data buffer 90. When the sampling-frequency decision module 700 decides a low sampling frequency such as 16 kHz, the down-sampling processing module 702 reads out the speech data stored in the speech lexicon 2 with down-sampling to 16 kHz, and stores it in the speech-data buffer 90.

Thus, in the embodiment of FIG. 5, by means of changing the sampling frequency of the speech data stored in the speech-data buffer 90 based on the CPU performance, the speech-synthesis processing suitable for the CPU performance may be realized by adjusting the amount of the speech data directed to the acoustic processing module 4.

Figure 6:
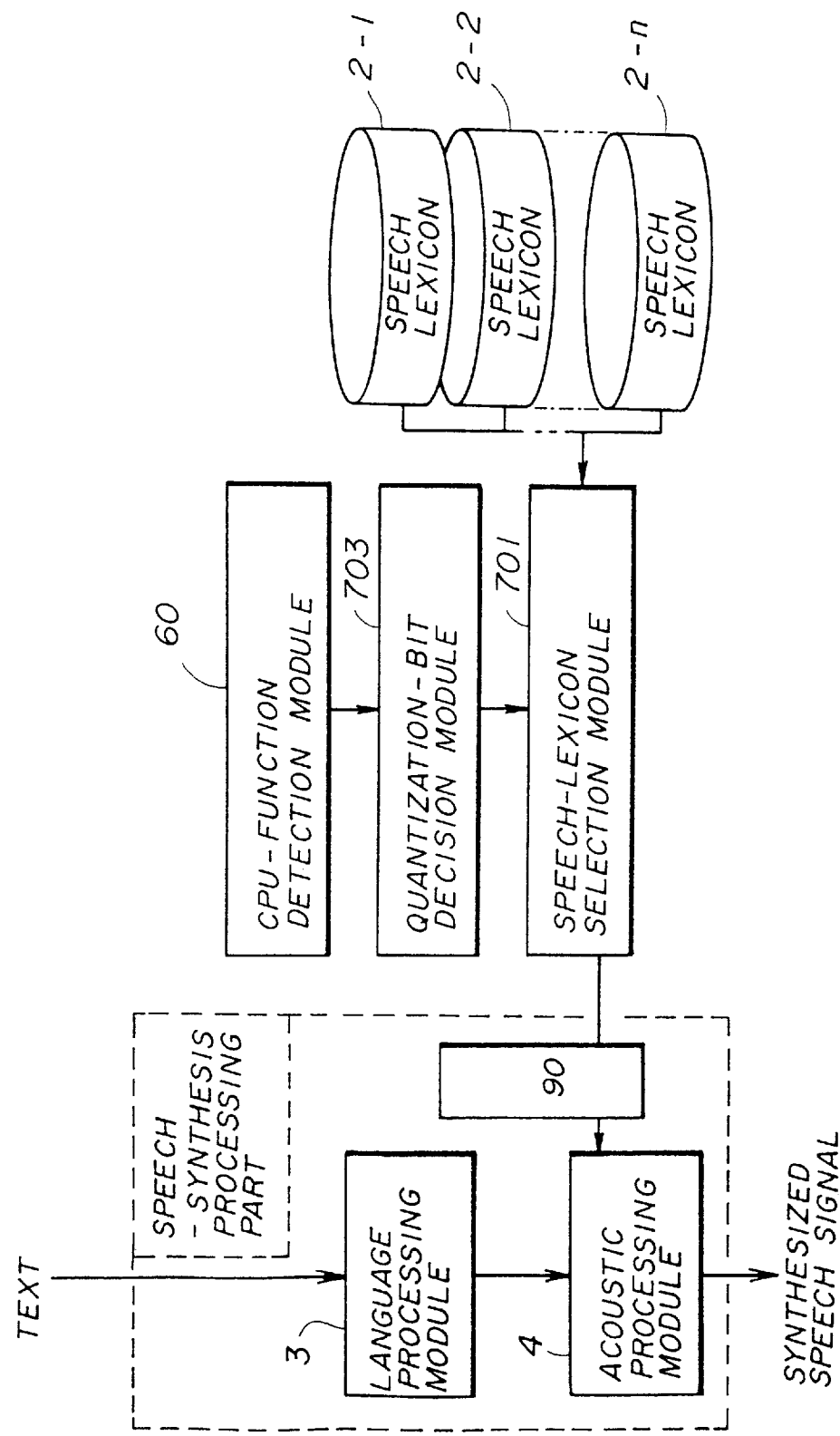

On the other hand, in the embodiment of FIG. 6, the system includes the plurality of the speech lexicons 2-i (i=1 to n) which manage the speech data having different numbers of the quantization bits. And the adjustment module 700 consists of a quantization-bit decision module 703 and the speech-lexicon selection module 701.

In the embodiment of FIG. 6 constructed in such a structure, once the CPU-function detection module 60 detects the CPU performance or the CPU load, and produces the level of the detection result, the quantization-bit decision module 703 decides the number of the quantization bits of the speech data based on the level detected in the CPU-function detection module 60. For example, when the detection result of the level which indicates high CPU performance is given from the CPU-function detection module 60, the quantization-bit decision module 703 decides to use the speech data having large quantization bits such as 16 bits because of the high processing performance, whereas when the detection result of the level which indicates low CPU performance is given, the module 703 decides to use the speech data having small quantization bits such as 8 bits because of the low processing performance.

And subsequently, the speech-lexicon selection module 701 receives the decision result of the quantization-bit decision module 703, and reads out the speech data from the speech lexicon 2-i which manages the speech data having a decided quantization-bit number, the speech data read out being stored in the speech-data buffer 90.

Thus, in the embodiment of FIG. 6, by means of changing the number of the quantization bits of the speech data stored in the speech-data buffer 90 based on the CPU performance, the speech-synthesis processing suitable for the CPU performance may be realized by adjusting the amount of the speech data directed to the acoustic processing module 4.

Figure 7:
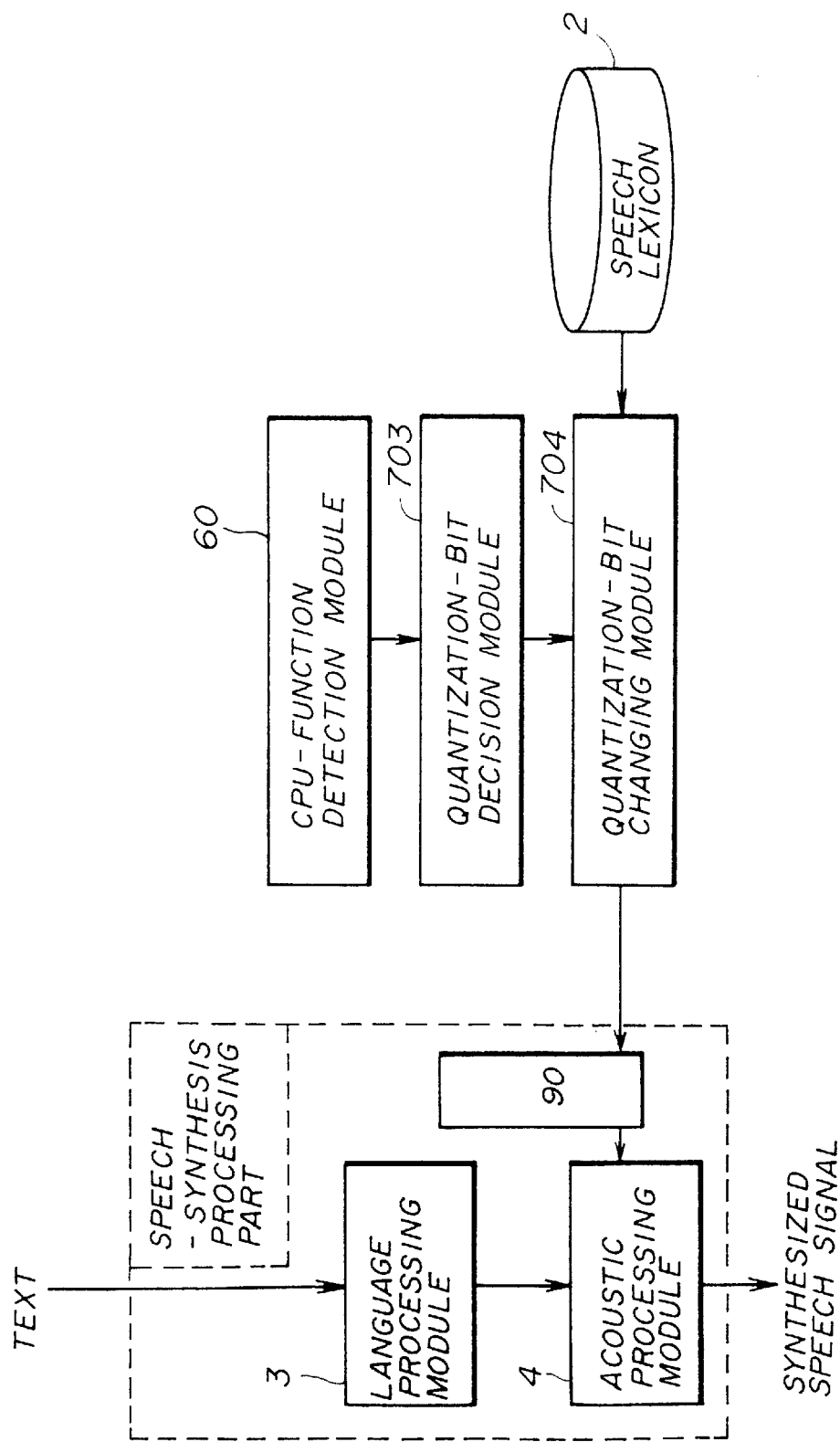

On the other hand, in the embodiment of FIG. 7, the system includes the single speech lexicon 2 which manages the speech data having the large number of the quantization bits, for example, 16 bits. The adjustment module 7 consists of the quantization-bit decision module 703 and a quantization-bit changing module 704.

In the embodiment of FIG. 7, once the CPU-function detection module 60 detects the CPU performance or the CPU load, and produces the level of the detection result, the quantization-bit decision module 703 decides the number of the quantization bits of the speech data based on the value of the level, as described above.

And subsequently, the quantization-bit changing module 704 receives the decision result of the quantization-bit decision module 703, and derives the speech data from the speech lexicon 2 to store it in the speech-data buffer 90 in a suitable quantization-bit number. For example, when the quantization-bit decision module 703 decides the number of the quantization bits is 16 bits, the quantization-bit changing module 704 reads out directly the speech data stored in the speech lexicon 2, and stores it in the speech-data buffer 90. When the quantization-bit decision module 703 decides the number of the quantization bits is 8 bits, the quantization-bit changing module 704 reads out the speech data stored in the speech lexicon 2, changes it to 8-bit quantization, and stores it in the speech-data buffer 90.

Thus, in the embodiment of FIG. 7, by means of changing the number of the quantization bits of the speech data stored in the speech-data buffer 90 based on the CPU performance, the speech-synthesis processing suitable for the CPU performance may be realized by adjusting the amount of the speech data directed to the acoustic processing module 4.

As described above, in the embodiments of FIGS. 4 to 7, the speech-synthesis processing suitable for the CPU performance may be realized by adjusting the amount of the speech data directed to the acoustic processing module 4 according to the detection result of the CPU-function detection module 60. Further, according to the detection result of the CPU-function detection module 60, by adjusting the amount of the speech data directed to the language processing module 3, the speech-synthesis processing suitable for the CPU performance may be also realized.

Next, descriptions will be given of other embodiments of the speech synthesis system according to the present invention, by referring to FIGS. 8 to 16. FIGS. 8 to 16 show examples of configurations of the speech synthesis system in the case that a memory-function detection module 61 is used in the detection module 6. A block shown as a reference numeral 80 represents a word-information buffer corresponding to the word-information storage area 8.

The memory-function detection module 61 detects the memory capacity or the memory-using situation by means of, for example, querying the operating system. These detecting results are processed to be represented with given levels.

Figure 8:
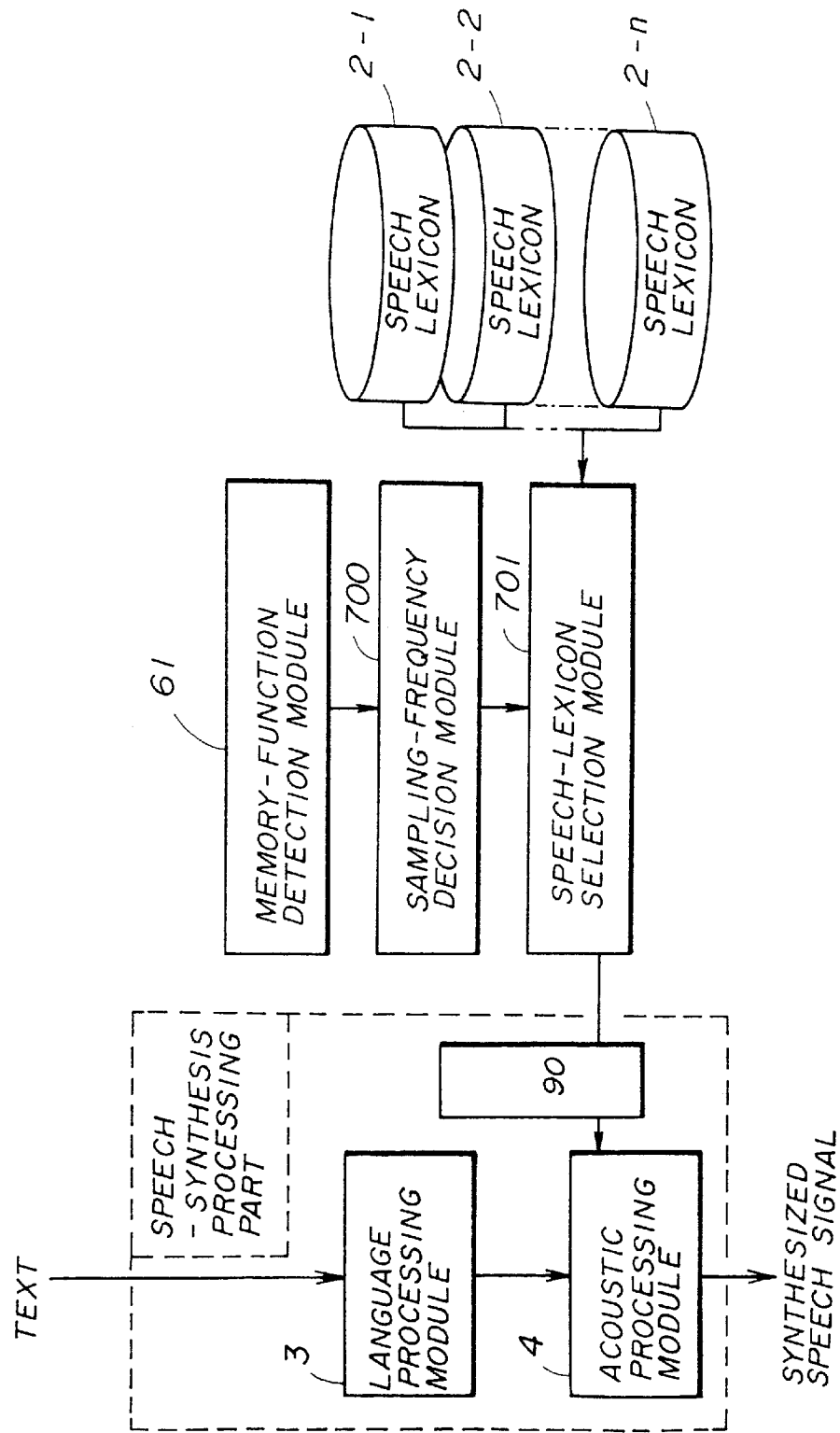
FIGS. 8 to 16 show examples of configurations of the speech synthesis system in a case that a memoryfunction detection module 61 is used in the detection module 6 in FIG. 2.

In the embodiment of FIG. 8, this system includes the plurality of speech lexicons 2-i (i=1 to n) which manage the speech data having different sampling frequencies. And the adjustment module 7 consists of the sampling-frequency decision module 700 and the speech-lexicon selection module 701.

In the embodiment of FIG. 8 constructed in such a structure, once the memory-function detection module 61 detects the memory capacity or the memory-using situation, and produces the level of the detection result, the sampling-frequency decision module 700 decides the sampling frequency of the speech data based on the level detected in the memory-function detection module 61. For example, when the detection result of the level which indicates high memory performance is given from the memory-function detection module 61, the sampling-frequency decision module 700 decides to use the speech data having the sampling frequency of, for example, 48 kHz, because of a sufficient memory, whereas when the detection result of the level which indicates low memory performance is given, the module 700 decides to use the speech data having the sampling frequency of, for example, 16 kHz, because of a small memory.

And subsequently, the speech-lexicon selection module 701 receives the decision result of the sampling-frequency decision module 700, and reads out the speech data from the speech lexicon 2-i which manages the speech data having a decided sampling frequency, the speech data read out being stored in the speech-data buffer 90.

Thus, in the embodiment of FIG. 8, by means of changing the sampling frequency of the speech data stored in the speech-data buffer 90 based on the memory performance, the speech-synthesis processing suitable for the memory performance may be realized by adjusting the amount of the speech data directed to the acoustic processing module 4.

Figure 9:
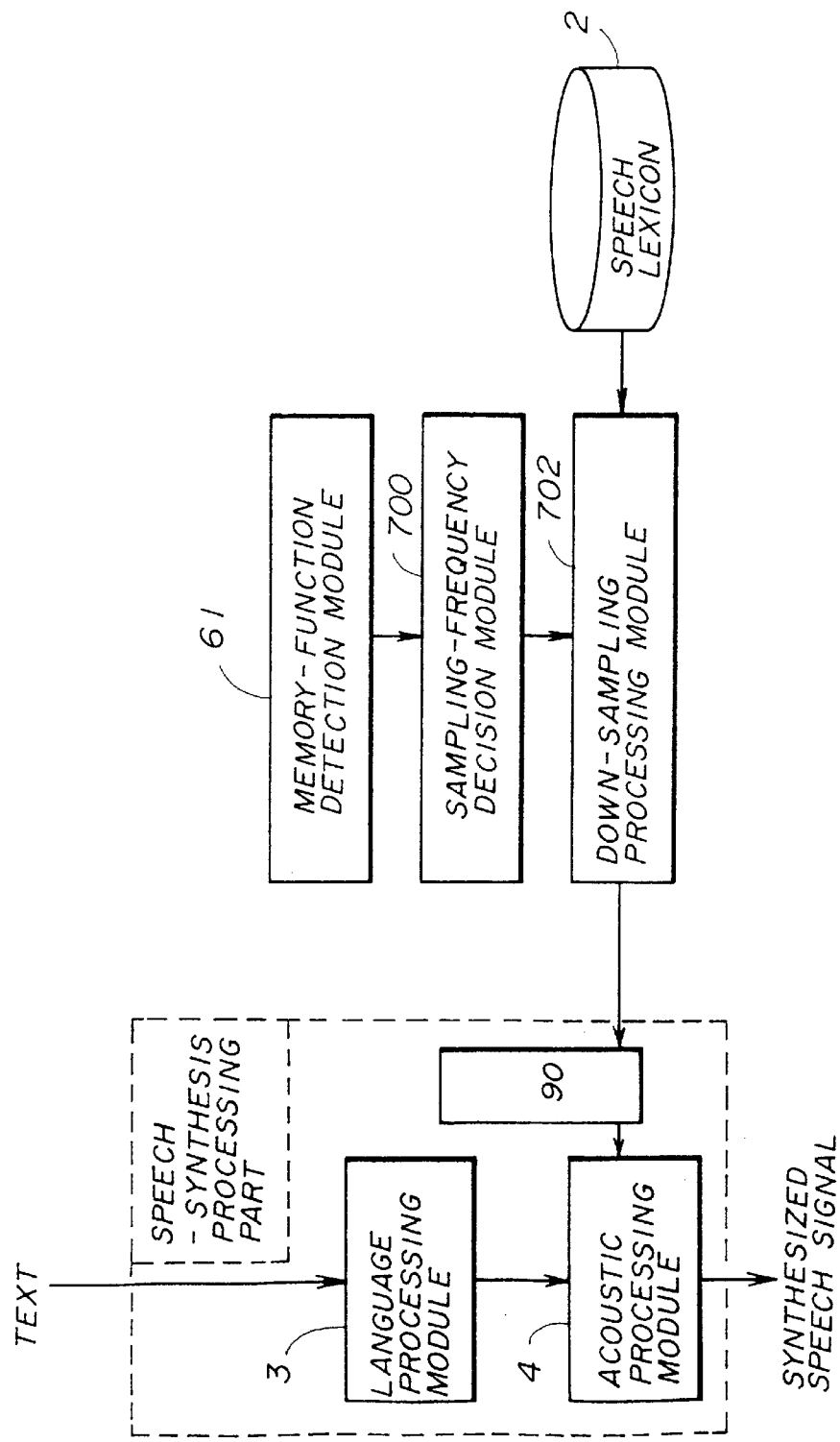

On the other hand, in the embodiment of FIG. 9, the system includes the single speech lexicon 2 which manages the speech data having the high sampling frequency of, for example, 48 kHz. The adjustment module 7 consists of the sampling-frequency decision module 700 and the down-sampling processing module 702.

In the embodiment of FIG. 9, once the memory-function detection module 61 detects the memory capacity or the memory-using situation, and produces the level of the detection result, the sampling-frequency decision module 700 decides the sampling frequency of the speech data based on the value of the level, as described above.

And subsequently, the down-sampling processing module 702 receives the decision result of the sampling-frequency decision module 700, and derives the speech data from the speech lexicon to store it in the speech-data buffer 90 in the suitable sampling frequency. For example, when the sampling-frequency decision module 700 decides the high sampling frequency such as 48 kHz, the down-sampling processing module 702 reads out directly the speech data stored in the speech lexicon 2, and stores it in the speech-data buffer 90. When the sampling-frequency decision module 700 decides the low sampling frequency such as 16 kHz, the down-sampling processing module 702 reads out the speech data stored in the speech lexicon 2 with down-sampling to 16 kHz, and stores it in the speech-data buffer 90.

Thus, in the embodiment of FIG. 9, by means of changing the sampling frequency of the speech data stored in the speech-data buffer 90 based on the memory performance, the speech-synthesis processing suitable for the memory performance may be realized by adjusting the amount of the speech data directed to the acoustic processing module 4.

Figure 10:
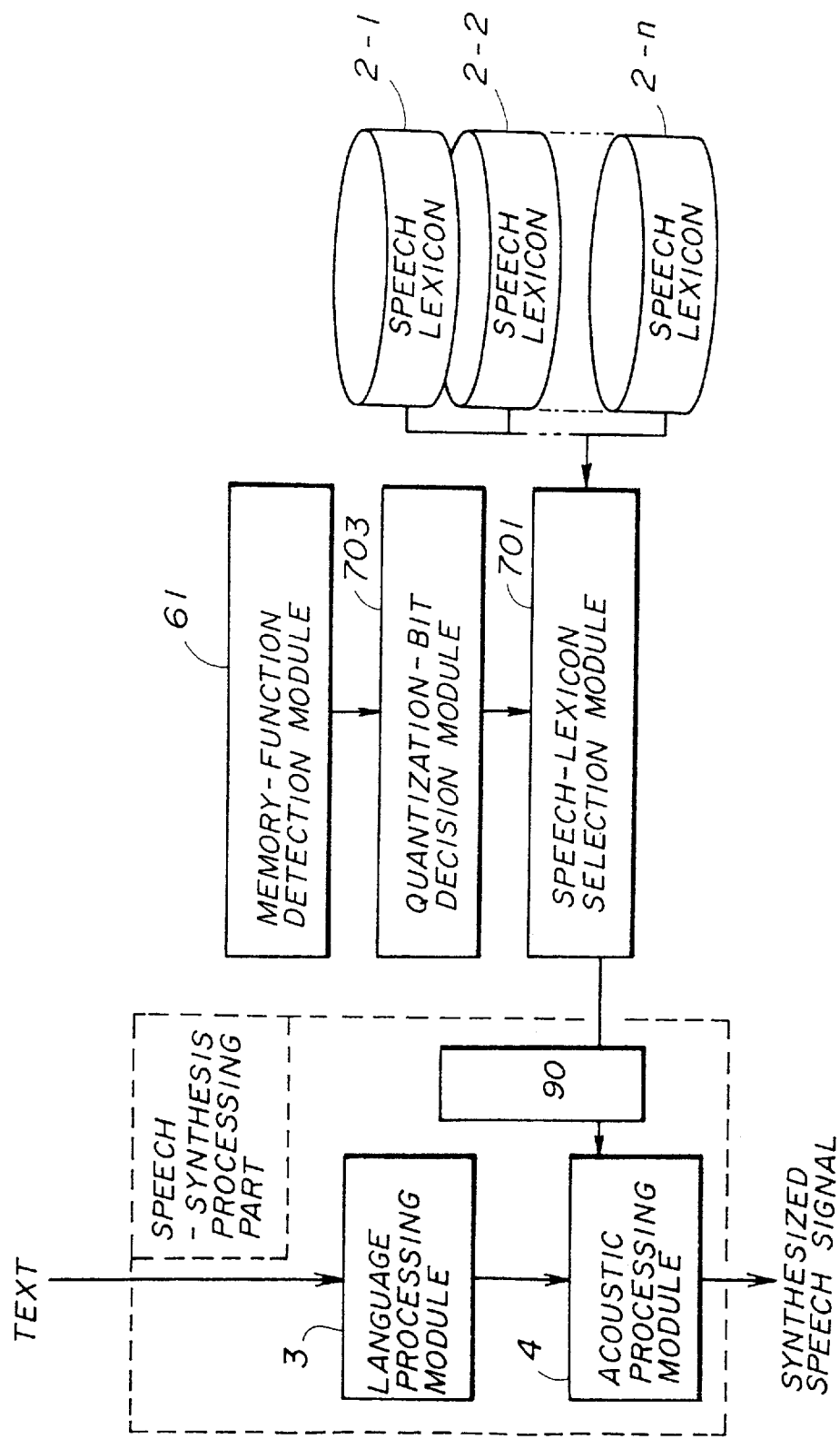

On the other hand, in the embodiment of FIG. 10, the system includes the plurality of the speech lexicons 2-i (i=1 to n) which manage the speech data having different numbers of the quantization bits. And the adjustment module 700 consists of the quantization-bit decision module 703 and the speech-lexicon selection module 701.

In the embodiment of FIG. 10 constructed in such a structure, once the memory-function detection module 61 detects the memory capacity or the memory-using situation, and produces the level of the detection result, the quantization-bit decision module 703 decides the number of the quantization bits of the speech data based on the level detected in the memory-function detection module 61. For example, when the detection result of the level which indicates the high memory performance is given from the memory-function detection module 61, the quantization-bit decision module 703 decides to use the speech data having large quantization bits such as 16 bits because of the sufficient memory, whereas when the detection result of the level which indicates the low memory performance is given, the module 703 decides to use the speech data having small quantization bits such as 8 bits because of the small memory.

And subsequently, the speech-lexicon selection module 701 receives the decision result of the quantization-bit decision module 703, and reads out the speech data from the speech lexicon 2-i which manages the speech data having the decided quantization-bit number, the speech data read out being stored in the speech-data buffer 90.

Thus, in the embodiment of FIG. 10, by means of changing the number of the quantization bits of the speech data stored in the speech-data buffer 90 based on the memory performance, the speech-synthesis processing suitable for the memory performance may be realized by adjusting the amount of the speech data directed to the acoustic processing module 4.

Figure 11:
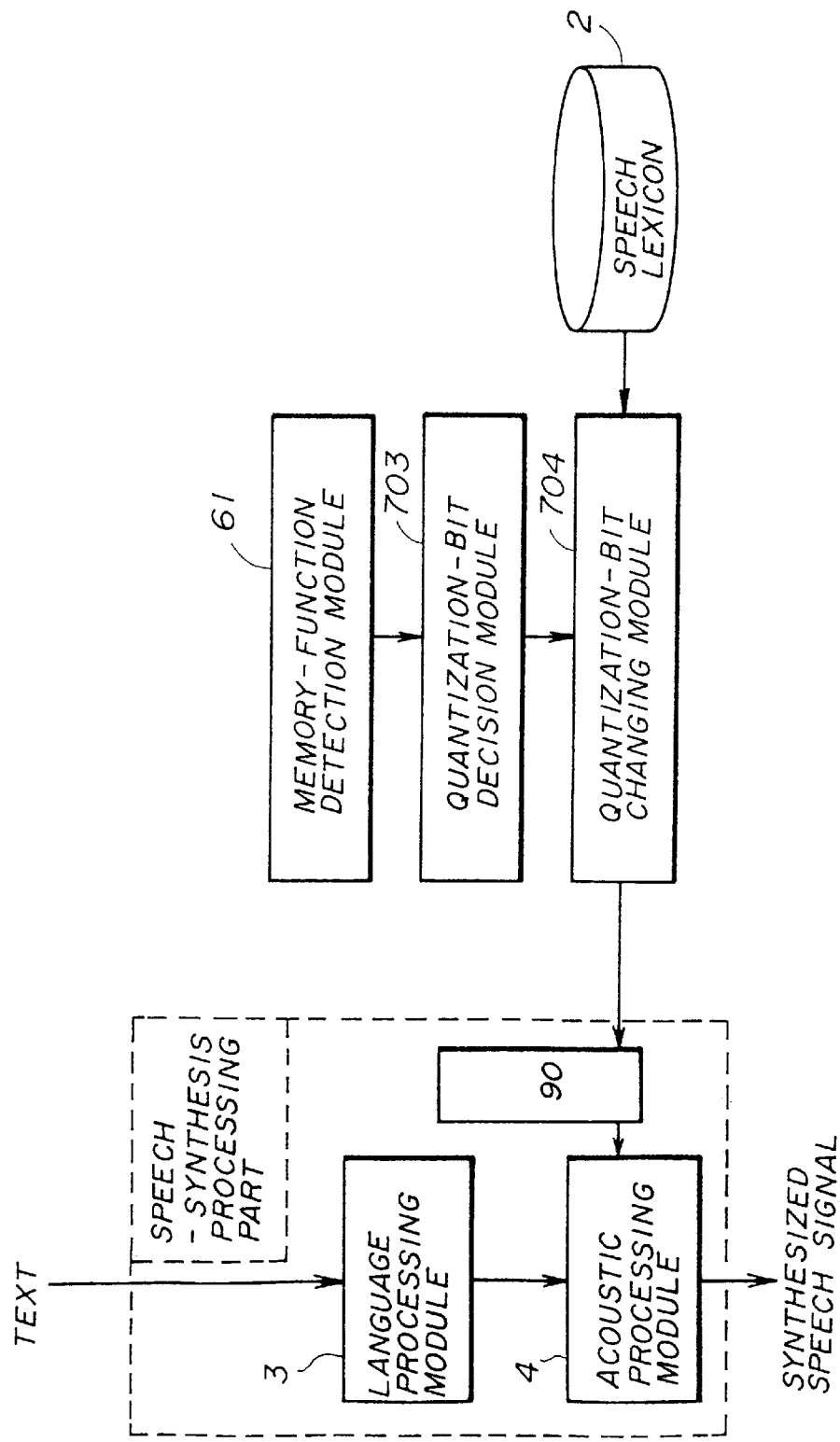

On the other hand, in the embodiment of FIG. 11, the system includes the single speech lexicon 2 which manages the speech data having the large number of the quantization bits, for example, 16 bits. The adjustment module 7 consists of the quantization-bit decision module 703 and the quantization-bit changing module 704.

In the embodiment of FIG. 11, once the memory-function detection module 61 detects the memory capacity or the memory-using situation, and produces the level of the detection result, the quantization-bit decision module 703 decides the number of the quantization bits of the speech data based on the value of the level, as described above.

And subsequently, the quantization-bit changing module 704 receives the decision result of the quantization-bit decision module 703, and derives the speech data from the speech lexicon 2 to store it in the speech-data buffer 90 in the suitable quantization-bit number. For example, when the quantization-bit decision module 703 decides the number of the quantization bits is 16 bits, the quantization-bit changing module 704 reads out directly the speech data stored in the speech lexicon 2, and stores it in the speech-data buffer 90. When the quantization-bit decision module 703 decides the number of the quantization bits is 8 bits, the quantization-bit changing module 704 reads out the speech data stored in the speech lexicon 2, changes it to 8-bit quantization, and stores it in the speech-data buffer 90.

Thus, in the embodiment of FIG. 11, by means of changing the number of the quantization bits of the speech data stored in the speech-data buffer 90 based on the memory performance, the speech-synthesis processing suitable for the memory performance may be realized by adjusting the amount of the speech data directed to the acoustic processing module 4.

Figure 12:
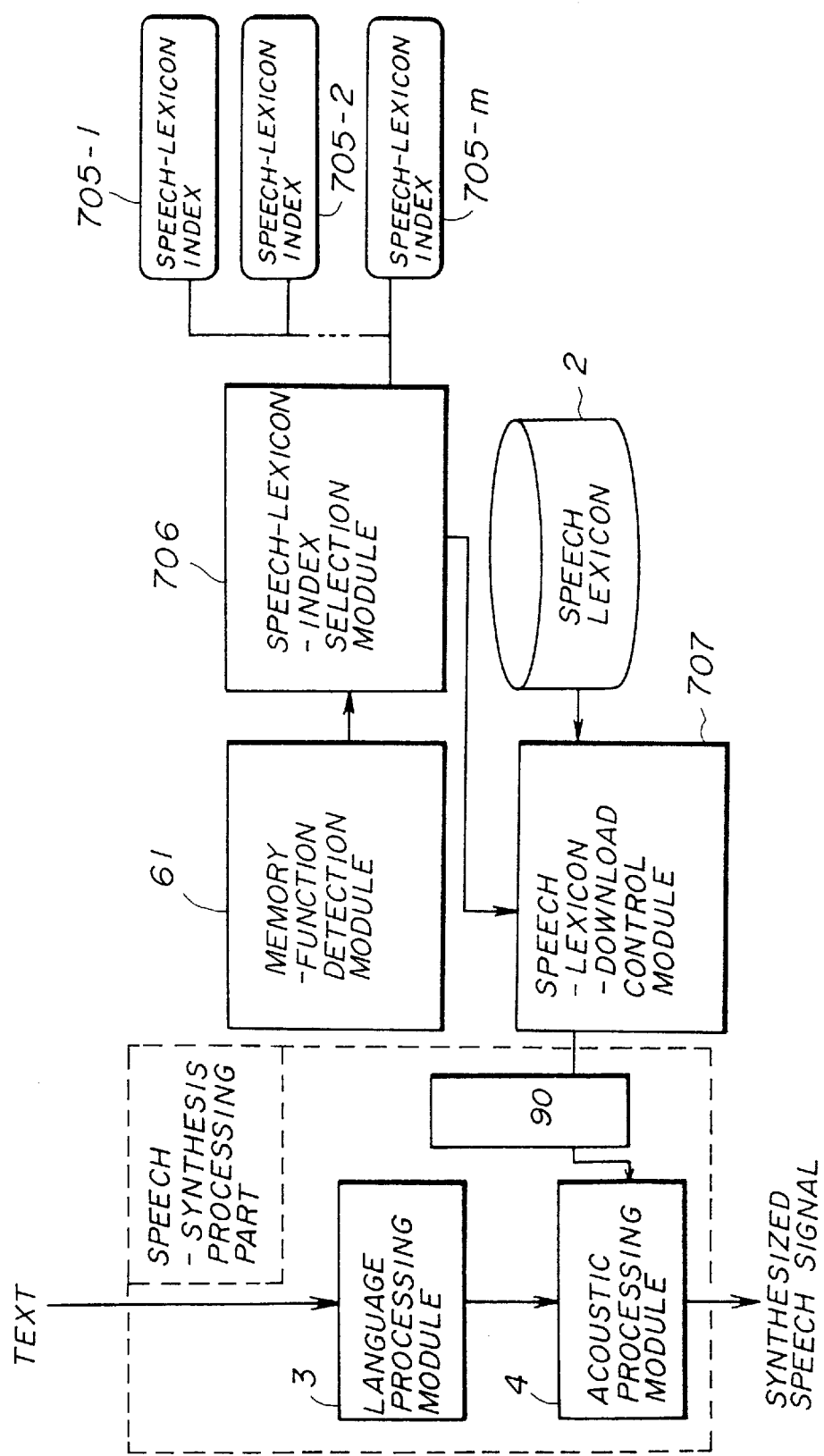

On the other hand, in the embodiment of FIG. 12, this system includes the single speech lexicon 2, and the adjustment module 7 consists of a plurality of speech-lexicon indexes 705-i (i=1 to m), a speech-lexicon-index selection module 706, and a speech-lexicon-download control module 707.

In the embodiment of FIG. 12 constructed in such a structure, once the memory-function detection module 61 detects the memory capacity or the memory-using situation, and produces the level of the detection result, the speech-lexicon-index selection module 706 decides the speech-lexicon index 705-i to be utilized based on the level detected in the memory-function detection module 61. For example, when the detection result of the level which indicates high memory performance is given from the memory-function detection module 61, the speech-lexicon-index selection module 706 decides to use the speech-lexicon index 705-i which indicates the speech data that realizes a high-quality speech-synthesis processing, because of the sufficient memory. Whereas when the detection result of the level which indicates low memory performance is given, the module 706 decides to use the speech-lexicon index 705-i which indicates the speech data that realizes a low-quality speech-synthesis processing, because of the small memory.

In other words, on the assumption that there are speech data "SA" and "A" in the speech lexicon 2, when there is not sufficient memory, the speech-lexicon-index selection module 706 selects the speech-lexicon index 705-i which has indicates only the speech data "A", because the speech data "A" may be also usable for the speech data "SA". When there is sufficient memory, the module 706 selects the speech-lexicon index 705-i which indicates both speech data "A" and "SA".

And subsequently, the speech-lexicon-download control module 707 receives the decision result of the speech-lexicon-index selection module 706, and reads out the speech data from the speech lexicon 2 which is indicated by the selected speech-lexicon index 705-i, the speech data read out being stored in the speech-data buffer 90.

Thus, in the embodiment of FIG. 12, by means of changing the quality of the speech data stored in the speech-data buffer 90 based on the memory performance, the speech-synthesis processing suitable for the memory performance may be realized by adjusting the amount of the speech data directed to the acoustic processing module 4.

Figure 13:
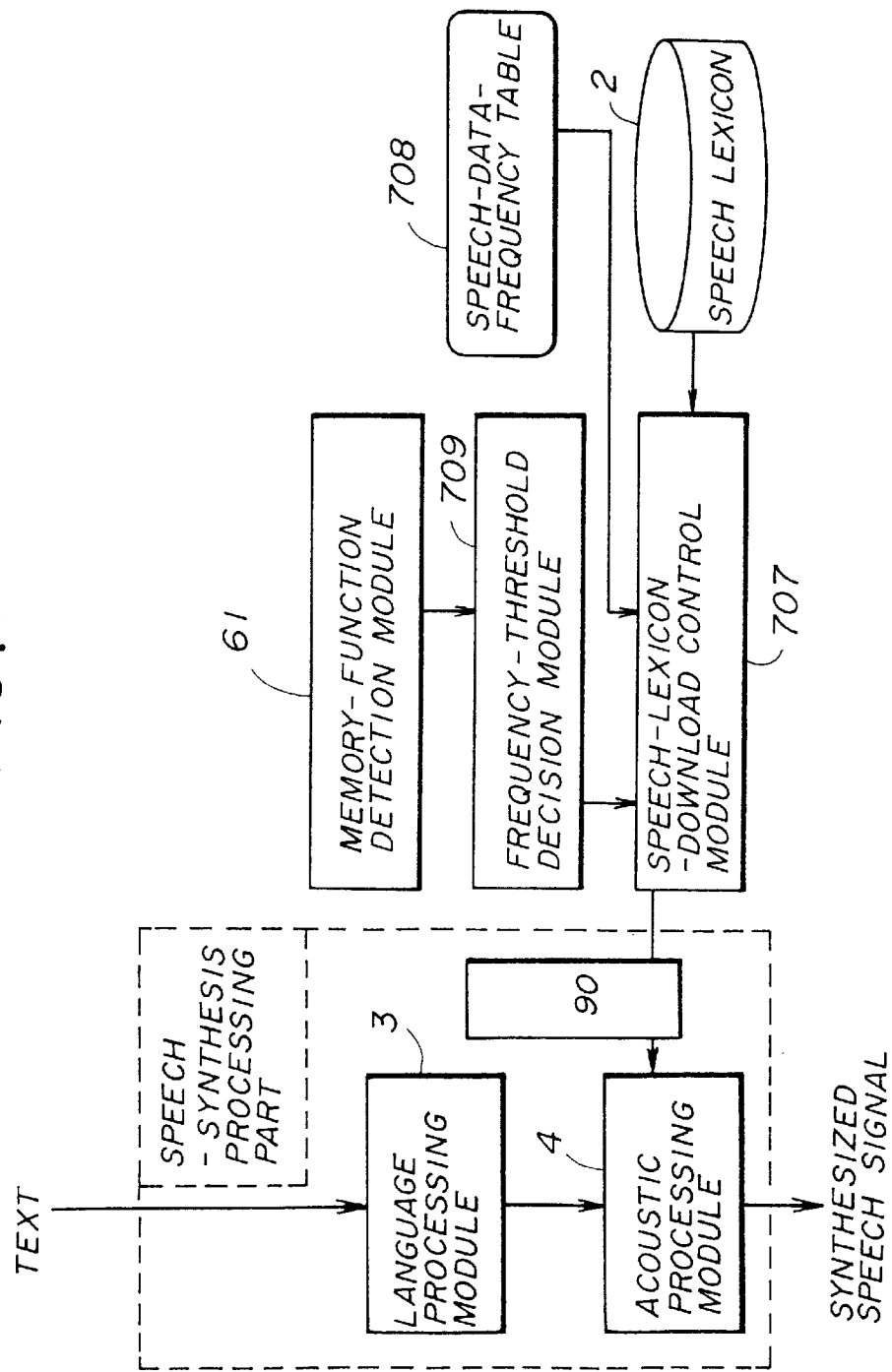

On the other hand, in the embodiment of FIG. 13, this system includes the single speech lexicon 2, and the adjustment module 7 consisting of a speech-data-frequency table 708, a frequency-threshold decision module 709, and the speech-lexicon-download control module 707.

In the embodiment of FIG. 13 constructed in such a structure, once the memory-function detection module 61 detects the memory capacity or the memory-using situation, and produces the level of the detection result, the frequency-threshold decision module 709 decides a frequency of use of the speech data based on the level detected in the memory-function detection module 61. For example, when the detection result of the level which indicates the high memory performance is given from the memory-function detection module 61, the frequency-threshold decision module 709 selects a small threshold level of the frequency of use to allow a storage of a large amount of the speech data, because of the sufficient memory. Whereas when the detection result of the level which indicates the low memory performance is given, the module 709 selects a large threshold level of the frequency of use to limit the storage to a small amount of the speech data, because of the small memory.

And subsequently, the speech-lexicon-download control module 707 receives the decision result of the frequency-threshold decision module 709, and reads out the speech data from the speech lexicon 2, which indicates a larger frequency of use than a selected frequency-threshold level, based on management data of the speech-data-frequency table 708 managing the frequency information of the speech data. The speech data read out is stored in the speech-data buffer 90.

Thus, in the embodiment of FIG. 13, by means of changing the amount of the speech data stored in the speech-data buffer 90 based on the memory performance, the speech-synthesis processing suitable for the memory performance may be realized by adjusting the amount of the speech data directed to the acoustic processing module 4.

Figure 14:
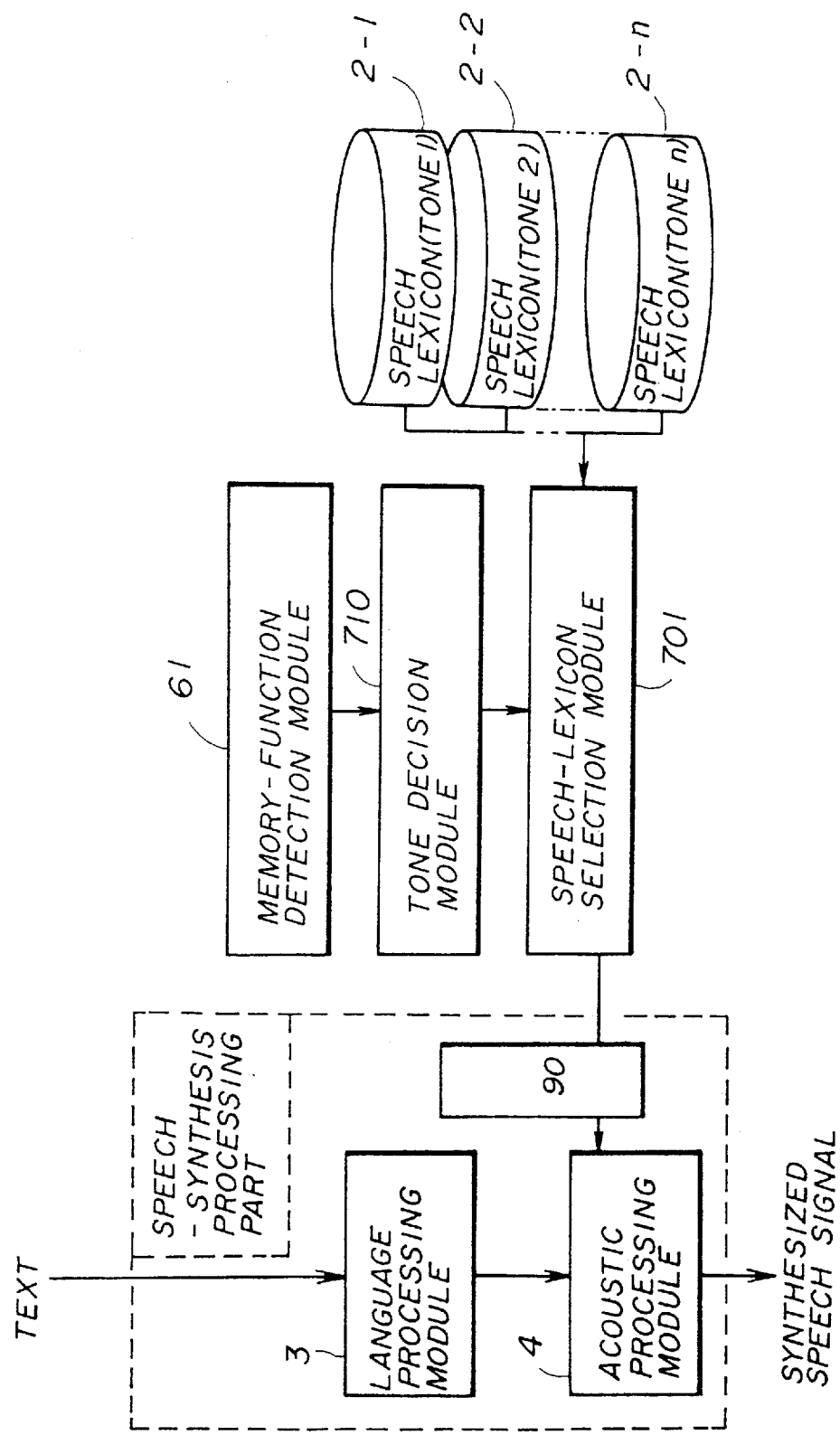

On the other hand, in the embodiment of FIG. 14, this system includes the plurality of speech lexicons 2-i (i=1 to n) which manage respective speech data having different tones such as a man's voice, a woman's voice, a child voice, and an old person's voice, and the adjustment module 7 consists of a tone decision module 710, and the speech-lexicon selection module 701.

In the embodiment of FIG. 14 constructed in such a structure, once the memory-function detection module 61 detects the memory capacity or the memory-using situation, and produces the level of the detection result, the tone decision module 710 selects the tone of the speech data based on the level detected in the memory-function detection module 61. For example, when the detection result of the level which indicates the high memory performance is given from the memory-function detection module 61, the tone decision module 710 selects a plurality of tones to allow a storage of the speech data of many tones, because of the sufficient memory. Whereas when the detection result of the level which indicates the low memory performance is given, the module 710 selects, for example, a specific tone to limit the storage of the speech data to one tone, because of the small memory.

And subsequently, the speech-lexicon selection module 701 receives the decision result of the tone decision module 710, and reads out the speech data of the selected tones from the speech lexicon 2, the speech data read out being stored in the speech-data buffer 90.

Thus, in the embodiment of FIG. 14, by means of changing the number of tones of the speech data stored in the speech-data buffer 90 based on the memory performance, the speech-synthesis processing suitable for the memory performance may be realized by adjusting the amount of the speech data directed to the acoustic processing module 4.

Figure 15:
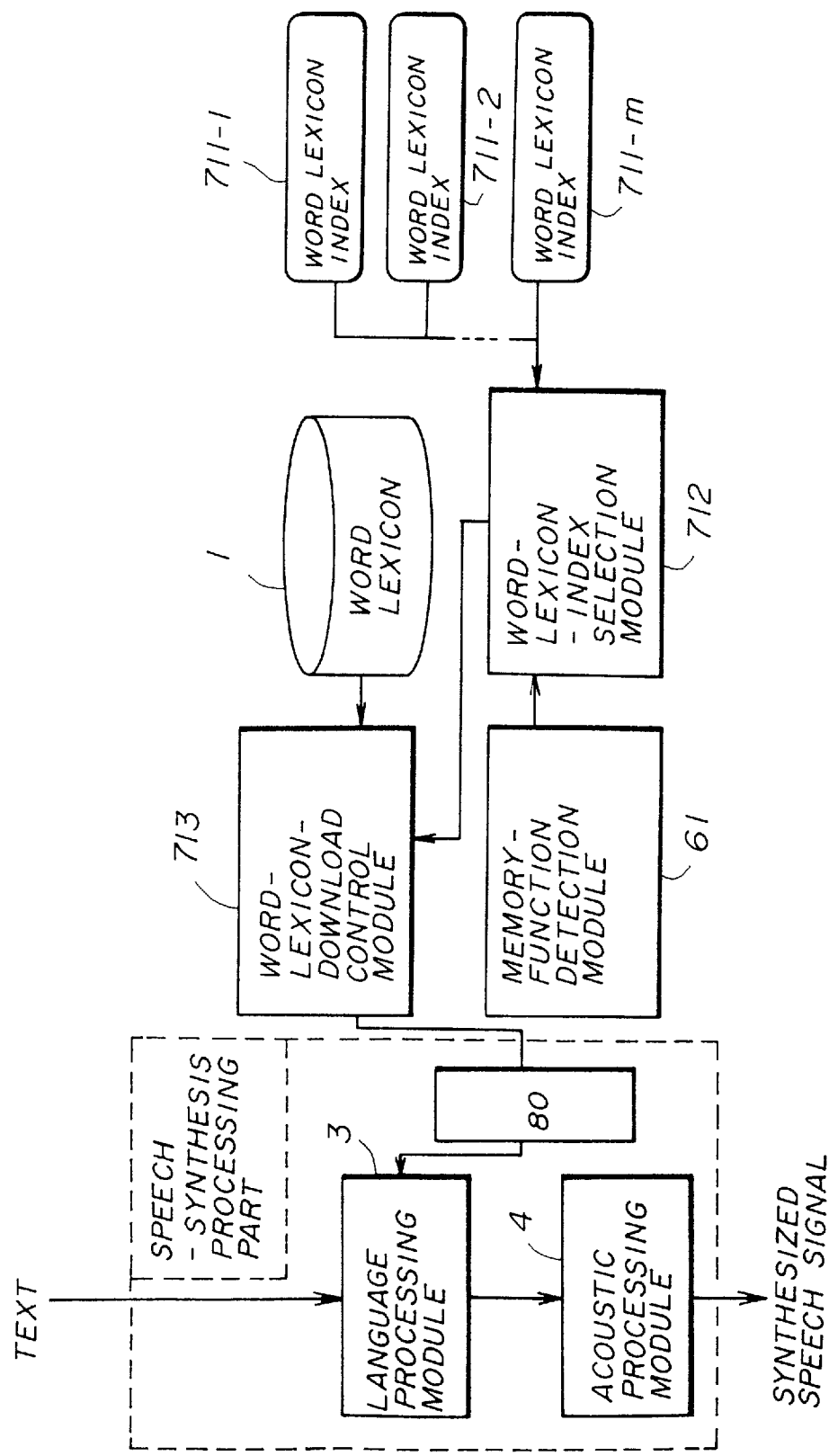

On the other hand, in the embodiment of FIG. 15, this system includes a single word lexicon 1, and the adjustment module 7 consists of a plurality of word-lexicon indexes 711-i (i=1 to m), a word-lexicon-index selection module 712, and a word-lexicon-download control module 713.

In the embodiment of FIG. 15 constructed in such a structure, once the memory-function detection module 61 detects the memory capacity or the memory-using situation, and produces the level of the detection result, the word-lexicon-index selection module 712 selects the word-lexicon index 711-i to be utilized based on the level detected in the memory-function detection module 61. For example, when the detection result of the level which indicates high memory performance is given from the memory-function detection module 61, the word-lexicon-index selection module 712 decides to use the word-lexicon index 711-i which indicates the word information that realizes the high-quality speech-synthesis processing, because of the sufficient memory. Whereas when the detection result of the level which indicates low memory performance is given, the module 712 decides to use the word-lexicon index 711-i which indicates the word information that realizes the low-quality speech-synthesis processing, because of the small memory.

And subsequently, the word-lexicon-download control module 713 receives the decision result of the word-lexicon-index selection module 712, and reads out the word information from the word lexicon 1, which is indicated by the selected word-lexicon index 711-i, the word information read out being stored in the word information buffer 80.

Thus, in the embodiment of FIG. 15, by means of changing the quality of the word information stored in the word-information buffer 80 based on the memory performance, the speech-synthesis processing suitable for the memory performance may be realized by adjusting the amount of the word information directed to the language processing module 3.

Figure 16:
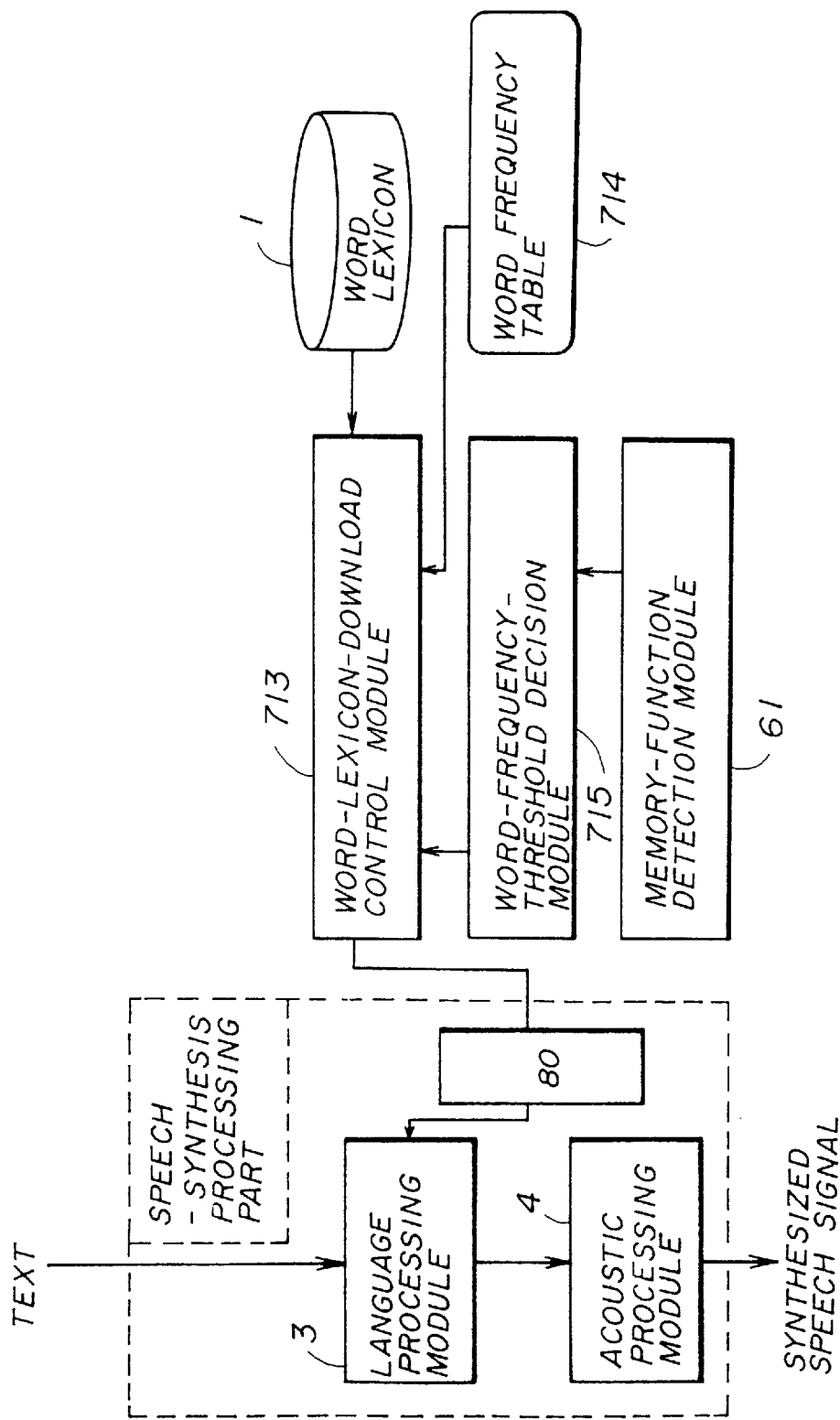

On the other hand, in the embodiment of FIG. 16, this system includes the single word lexicon 1, and the adjustment module 7 consisting of a word-frequency table 714, a word-frequency-threshold decision module 715, and the word-lexicon-download control module 713.

In the embodiment of FIG. 16 constructed in such a structure, once the memory-function detection module 61 detects the memory capacity or the memory-using situation, and produces the level of the detection result, the word-frequency-threshold decision module 715 selects the threshold level of the frequency of use of the word information based on the level detected in the memory-function detection module 61. For example, when the detection result of the level which indicates the high memory performance is given from the memory-function detection module 61, the word-frequency-threshold decision module 715 selects a small threshold level of the frequency of use to allow storage of a large amount of word information, because of the sufficient memory. Whereas when the detection result of the level which indicates low memory performance is given, the module 715 selects a large threshold level of the frequency of use to limit the storage to a small amount of word information, because of the small memory.

And subsequently, the word-lexicon-download control module 713 receives the decision result of the word-frequency-threshold decision module 715, and reads out the word information from the word lexicon 1, which indicates a larger frequency of use than a selected frequency threshold level, based on management data of the word-frequency table 714 managing the frequency information of the word information. The word information read out is stored in the word information buffer 80.

Thus, in the embodiment of FIG. 16, by means of changing the amount of the word information stored in the word-information buffer 80 based on the memory performance, the speech-synthesis processing suitable for the memory performance may be realized by adjusting the amount of the word information directed to the language processing module 3.

As described above, in the embodiments of FIGS. 8 to 16, the speech-synthesis processing suitable for the memory performance may be realized by adjusting the amount of the speech data directed to the acoustic processing module 4 or the amount of the word information directed to the language processing module 3, according to the detection result of the memory-function detection module 61.

Next, descriptions will be given of still other embodiments of the speech synthesis system according to the present invention, by referring to FIGS. 17 to 20. FIGS. 17 to 20 show examples of configurations of the speech synthesis system in the case that a second-order-storage-device-function detection module 62 is used in the detection module 6. This function detection module 62 detects an access performance of the second-order storage device by, for example, performing a read processing. This detection result is processed to be represented with any of the given levels.

Figure 17:
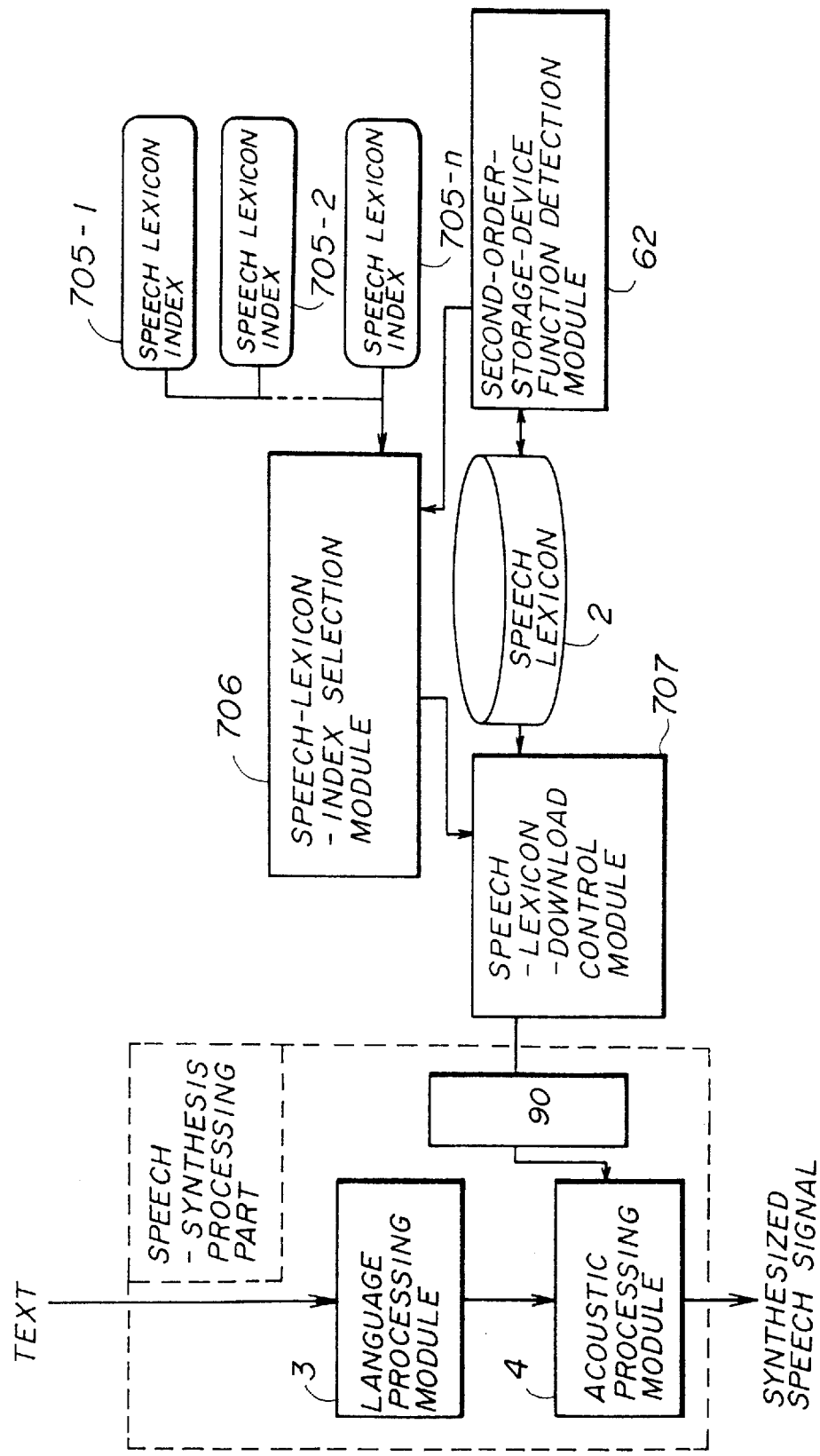
FIGS. 17 to 20 show examples of configurations of the speech synthesis system in a case that a second-order-storage-device-function detection module 62 is used in the detection module 6 in FIG. 2.

In the embodiment of FIG. 17, this system also includes the single speech lexicon 2, and the adjustment module 7 consisting of the plurality of speech-lexicon indexes 705-i (i=1 to m), the speech-lexicon-index selection module 706, and the speech-lexicon-download control module 707.

In the embodiment of FIG. 17 constructed in such a structure, once the function detection module 62 detects the access performance of the second-order storage device which stores the speech lexicon 2 by means of reading the speech data of the speech lexicon 2, and produces the level of the detection result, the speech-lexicon-index selection module 706 selects the speech-lexicon index 705-i to be utilized based on the level detected in the function detection module 62. For example, when the detection result of the level which indicates high-speed access performance is given from the function detection module 62, the speech-lexicon-index selection module 706 decides to use the speech-lexicon index 705-i which indicates the speech data that realizes a low-quality speech-synthesis processing, because the speech-synthesis processing may be performed by accessing the speech lexicon 2 on each occasion. Whereas when the detection result of the level which indicates slow-speed access performance is given, the module 706 decides to use the speech-lexicon index 705-i which indicates the speech data that realizes a high-quality speech-synthesis processing, because the speech-synthesis processing may not be performed by accessing the speech lexicon 2 on each occasion.

In other words, on the assumption that there are the speech data "SA" and "A" in the speech lexicon 2, when good access performance is obtained in the second-order storage device which stores the speech lexicon 2, the speech-lexicon-index selection module 706 decides to use the speech-lexicon index 705-i which indicates only the speech data "A", because the speech data "A" may be also usable for the speech data "SA". When the good access performance is not obtained, the module 706 decides to use the speech-lexicon index 705-i which indicates both speech data "A" and "SA".

And subsequently, the speech-lexicon-download control module 707 receives the decision result of the speech-lexicon-index selection module 706, and reads out the speech data indicated by the selected speech-lexicon index 705-i, from the speech lexicon 2. The speech data read out is stored in the speech-data buffer 90. In this configuration, when the speech data for realizing the high-quality speech-synthesis processing is not read out to the speech-data buffer 90, the acoustic processing module 4 processes to directly access the speech data in the speech lexicon 2 of the second-order storage device having the high-speed access performance.

Thus, in the embodiment of FIG. 17, by means of changing the quality of the speech data stored in the speech-data buffer 90 based on the access performance of the second-order storage device, the speech-synthesis processing suitable for the access performance of that storage device may be realized by adjusting the amount of the speech data directed to the acoustic processing module 4.

Figure 18:
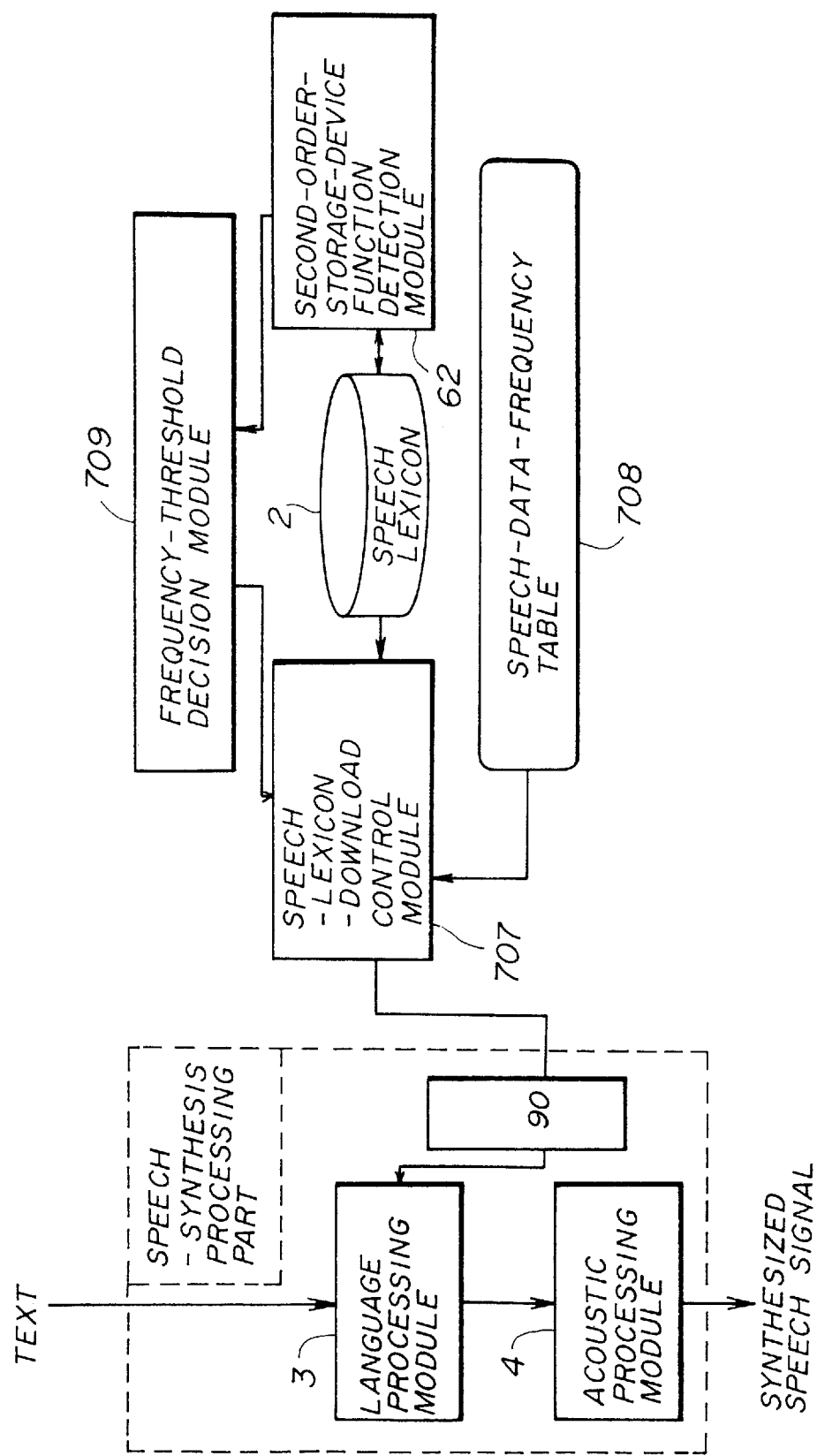

On the other hand, in the embodiment of FIG. 18, this system includes the single speech lexicon 2, and the adjustment module 7 consisting of the speech-data-frequency table 708, the frequency-threshold decision module 709, and the speech-lexicon-download control module 707.

In the embodiment of FIG. 18 constructed in such a structure, as described above, once the second-order-storage-device-function detection module 62 detects the access performance of the second-order storage device which stores the speech lexicon 2, and produces the level of the detection result, the frequency-threshold decision module 709 selects the threshold level of the frequency of use of the speech data based on the level detected in the function detection module 62. For example, when the detection result of the level which indicates the high-speed access performance of the storage device is given from the function detection module 62, the frequency-threshold decision module 709 selects a large threshold level of the frequency of use to limit the storage to the small amount of the speech data, because the speech-synthesis processing may be performed by accessing the speech lexicon 2 on each occasion. Whereas when the detection result of the level which indicates the slow-speed access performance is given, the module 709 selects a small threshold level of the frequency of use to allow the storage of the large amount of the speech data, because the speech-synthesis processing may not be performed by accessing the speech lexicon 2 on each occasion.

And subsequently, the speech-lexicon-download control module 707 receives the decision result of the frequency-threshold decision module 709, and reads out the speech data from the speech lexicon 2, which indicates the larger frequency of use than the selected frequency threshold level, based on management data of the speech-data-frequency table 708 managing the frequency information of the speech data. The speech data read out is stored in the speech data buffer 90.

Thus, in the embodiment of FIG. 18, by means of changing the amount of the speech data stored in the speech-data buffer 90 based on the access performance of the second-order storage device, the speech-synthesis processing suitable for the access performance of the storage device may be realized by adjusting the amount of the speech data directed to the acoustic processing module 4.

Figure 19:
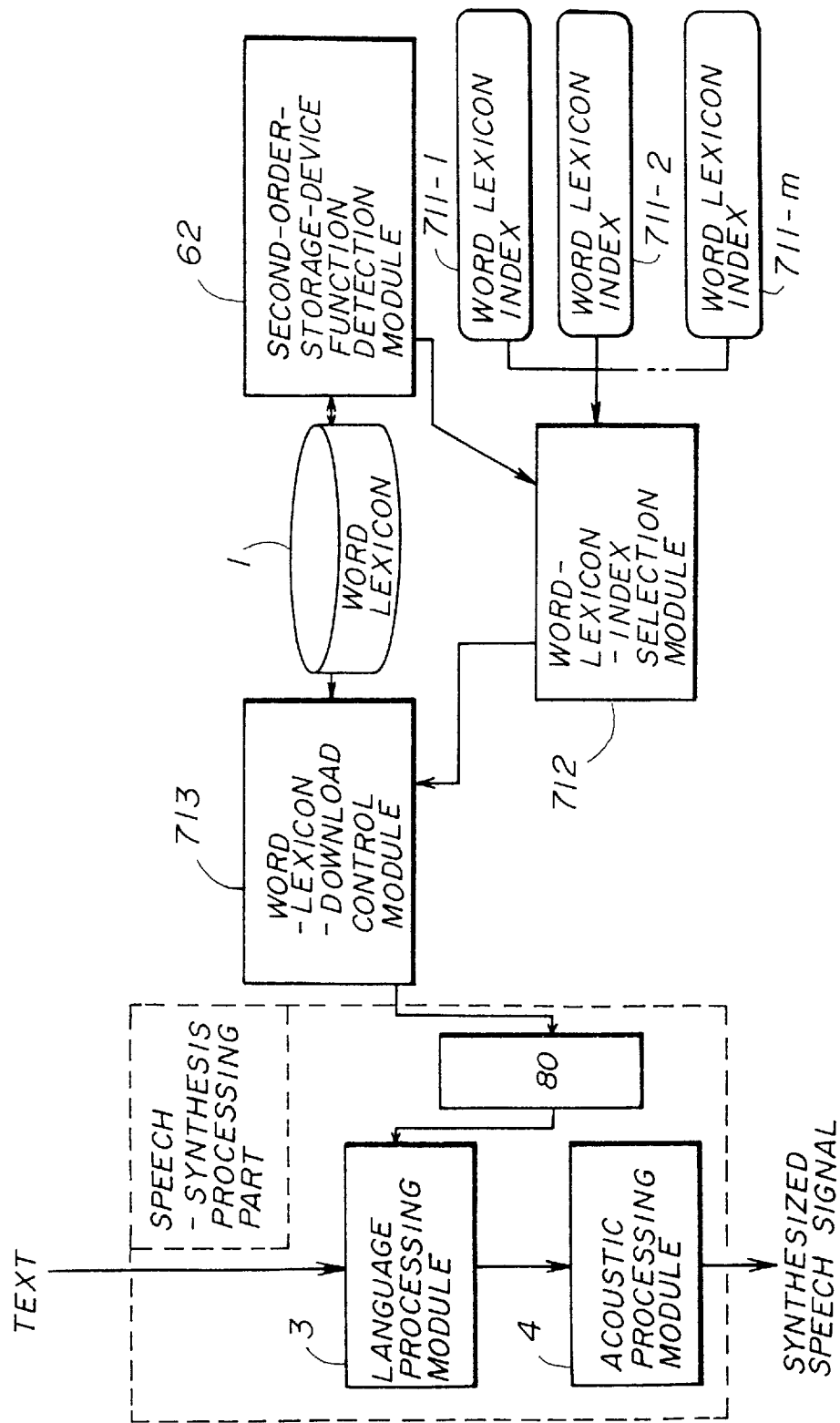

On the other hand, in the embodiment of FIG. 19, this system includes the single word lexicon 1, and the adjustment module 7 consisting of the plurality of word-lexicon indexes 711-i (i=1 to m), the word-lexicon-index selection module 712, and the word-lexicon-download control module 713.

In the embodiment of FIG. 19 constructed in such a structure, once the second-order-storage-device function detection module 62 detects the access performance of the second-order storage device which stores the word lexicon 1 by means of reading the word information of the word lexicon 1, and produces the level of the detection result, the word-lexicon-index selection module 712 selects the word-lexicon index 711-i to be utilized based on the level detected in the function detection module 62. For example, when the detection result of the level which indicates the high-speed access performance is given from the function detection module 62, the word-lexicon-index selection module 712 decides to use the word-lexicon index 711-i which indicates the word information that realizes the low-quality word-synthesis processing, because the speech-synthesis processing may be performed by accessing the word lexicon 1 on each occasion. Whereas when the detection result of the level which indicates the slow-speed access performance is given, the module 712 decides to use the word-lexicon index 711-i which indicates the word information that realizes the high-quality speech-synthesis processing, because the speech-synthesis processing may not be performed by accessing the word lexicon 1 on each occasion.

In other words, when the good access performance is obtained in the second-order storage device which stores the word lexicon 1, the word-lexicon-index selection module 712 decides to use the word-lexicon index 711-i which indicates main word information. When the good access performance is not obtained, the module 712 decides to use the speech-lexicon index 711-i which indicates both the main word information and its additional word information.

And subsequently, the word-lexicon-download control module 713 receives the decision result of the word-lexicon-index selection module 712, and reads out the word information, which is indicated by the selected word-lexicon index 711-i, from the word lexicon 1. The word information read out is stored in the word-information buffer 80. In this configuration, when the word information for realizing the high-quality speech-synthesis processing is not read out to the word-information buffer 80, the language processing module 3 processes to directly access the word information from the word lexicon 1 of the second-order storage device having the high-speed access performance.

Figure 20:
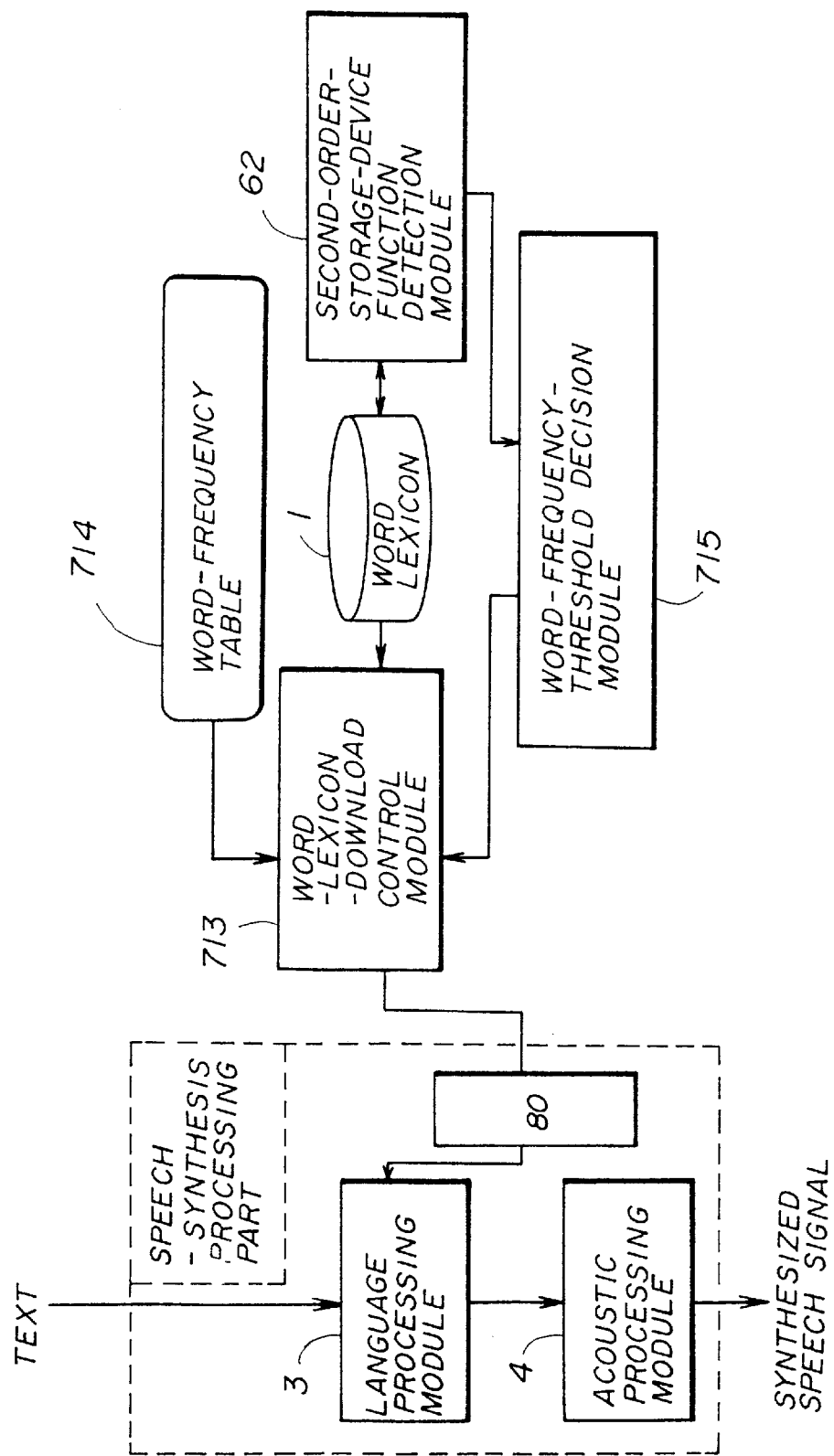

On the other hand, in the embodiment of FIG. 20, this system includes the single word lexicon 1, and the adjustment module 7 consists of the word-frequency table 714, the word-frequency-threshold decision module 715, and the word-lexicon-download control module 713.

In the embodiment of FIG. 20 constructed in such a structure, as described above, once the second-order-storage-device-function detection module 62 detects the access performance of the second-order storage device which stores the word lexicon 1, and produces the level of the detection result, the word-frequency-threshold decision module 715 selects the threshold level of the frequency of use of the word information based on the level detected in the function detection module 62. For example, when the detection result of the level which indicates the high-speed access performance of the storage device is given from the function detection module 62, the word-frequency-threshold decision module 715 selects the large threshold level of the frequency of use to limit the storage to the small amount of word information, because the speech-synthesis processing may be performed by accessing the word lexicon 1 on each occasion. Whereas when the detection result of the level which indicates the slow-speed access performance is given, the module 715 selects a small threshold level of the frequency of use to allow the storage of the large amount of word information, because the speech-synthesis processing may not be performed by accessing the word lexicon 1 on each occasion.

And subsequently, the word-lexicon-download control module 713 receives the selection result of the word-frequency-threshold decision module 715, and reads out the word information from the word lexicon 1, which indicates the larger frequency of use than the selected frequency threshold level, based on management data of the word-information-frequency table 714 managing the frequency information of the word information. The word information read out is stored in the word-information buffer 80.

Thus, in the embodiment of FIG. 20, by means of changing the amount of the word information stored in the word-information buffer 80 based on the access performance of the second-order storage device, the speech-synthesis processing suitable for the access performance of the storage device may be realized by adjusting the amount of the word information directed to the language processing module 3.

As described above, in the embodiments of FIGS. 17 to 20, the speech-synthesis processing suitable for the access performance of the second-order storage device may be realized by adjusting the amount of the speech data directed to the acoustic processing module 4 or the amount of the word information directed to the language processing module 3, according to the detection result of the second-order-storage-device-function detection module 62.

Figure 21:
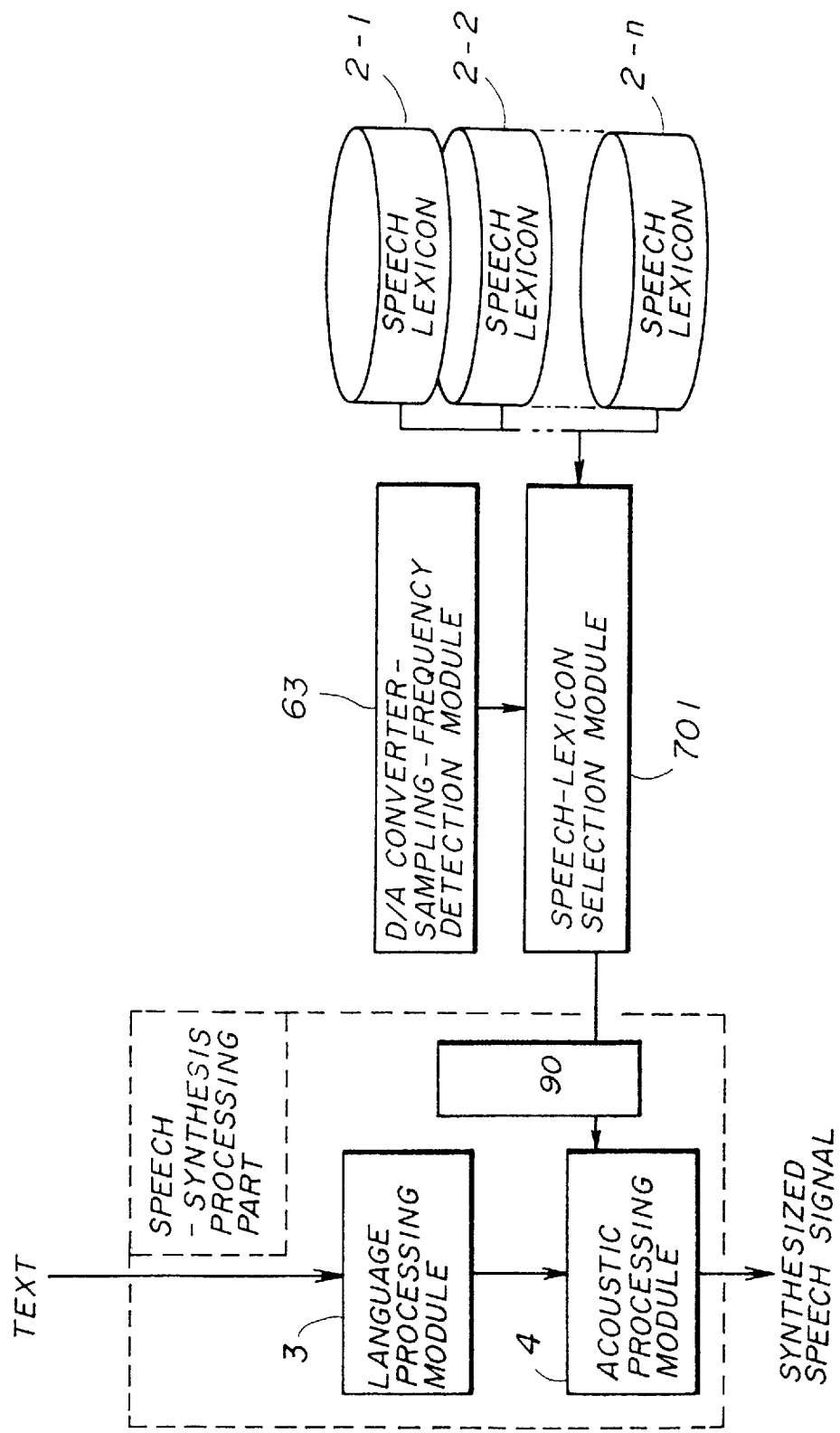
FIGS. 21 and 22 show examples of configurations of the speech synthesis system in a case that a D/A-converter-sampling-frequency detection module 63 is used in the detection module 6 in FIG. 2.
Figure 22:
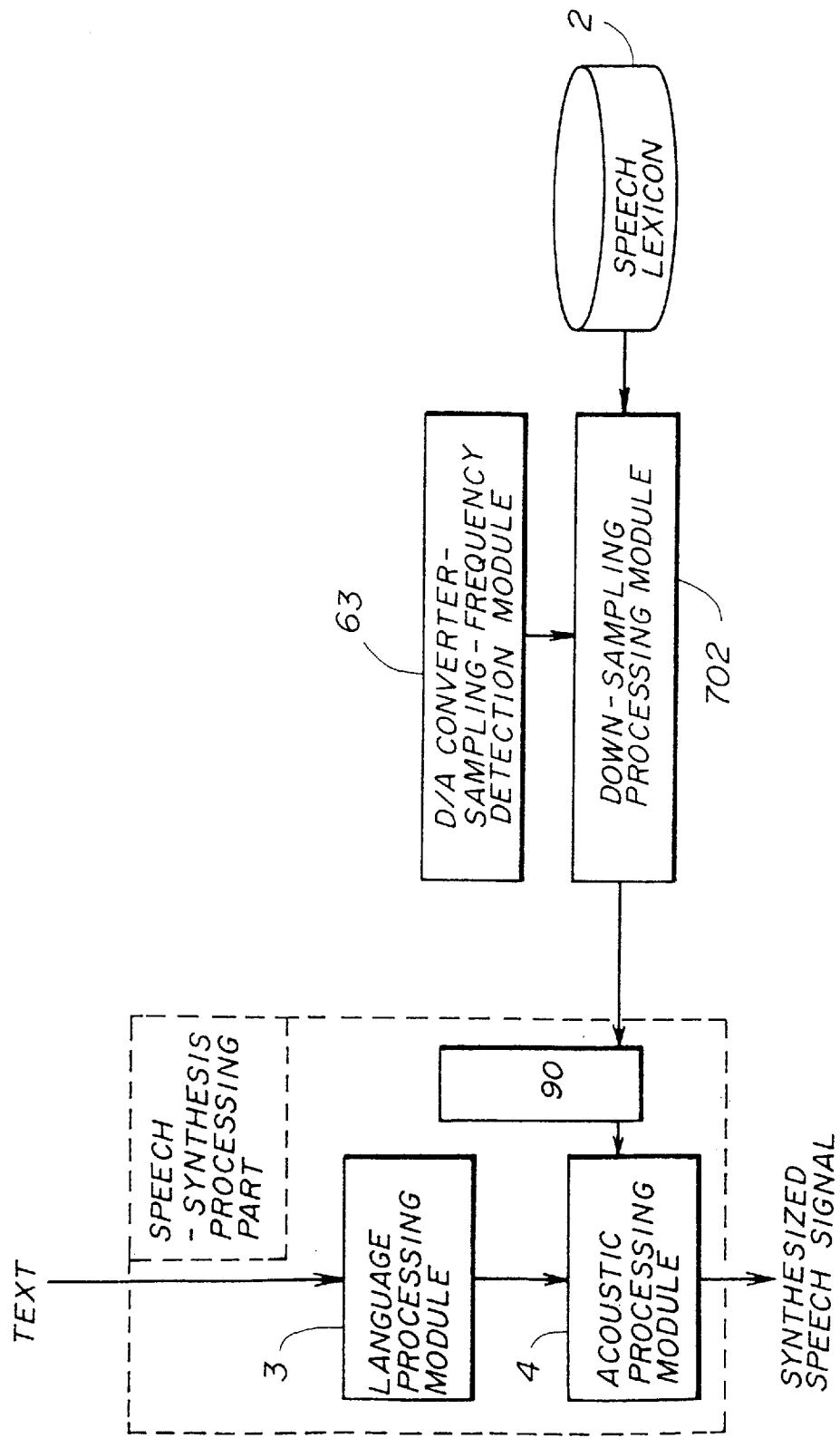

Next, descriptions will be given of other embodiments of the speech synthesis system according to the present invention, by referring to FIGS. 21 and 22. FIGS. 21 and 22 show examples of configurations of the speech synthesis system in the case that a D/A-converter-sampling-frequency detection module 63 is used in the detection module 6. This frequency detection module 63 detects a sampling frequency of the D/A converter 5 by, for example, querying the operating system.

In the embodiment of FIG. 21, the system includes the plurality of speech lexicons 2-i (i=1 to n) which manage the speech data having different sampling frequencies. And the adjustment module 7 consists of the speech-lexicon selection module 701.

In the embodiment of FIG. 21 constructed in such a structure, once the D/A-converter-sampling-frequency detection module 63 detects the sampling frequency of the D/A converter 5, the speech-lexicon selection module 701 reads out, according to the detection result, the associated speech data from the speech lexicon 2-i which manages the speech data having the same sampling frequency. And the speech data read out is stored in the speech-data buffer 90.

Thus, in the embodiment of FIG. 21, by means of changing the sampling frequency of the speech data stored in the speech-data buffer 90 to a frequency adjustable for the D/A converter 5, the speech-synthesis processing suitable for the D/A converter 5 may be realized.

On the other hand, in the embodiment of FIG. 22, the system includes the single speech lexicon 2 which manages the speech data having the high sampling frequency of, for example, 48 kHz. The adjustment module 7 consists of the down-sampling processing module 702.

In the embodiment of FIG. 5, once the frequency detection module 63 detects the sampling frequency of the D/A converter 5, the down-sampling processing module 702 receives the detection result of the sampling frequency, and derives the speech data from the speech lexicon 2 to store it in the speech-data buffer 90 in the suitable sampling frequency. For example, when the sampling frequency of the D/A converter 5 is 48 kHz, the down-sampling processing module 702 reads out directly the speech data stored in the speech lexicon 2, and stores it in the speech-data buffer 90. When the sampling frequency of the D/A converter 5 is 16 kHz, the down-sampling processing module 702 reads out the speech data stored in the speech lexicon 2 with down-sampling to 16 kHz, and stores it in the speech-data buffer 90.

Thus, in the embodiment of FIG. 22, by means of changing the sampling frequency of the speech data stored in the speech-data buffer 90 to the frequency adjustable for the D/A converter 5, the speech-synthesis processing suitable for the D/A converter 5 may be realized.

As described above, in the embodiments of FIGS. 21 and 22, the speech-synthesis processing suitable for the D/A converter 5 may be realized by adjusting the sampling frequency of the speech data directed to the acoustic processing module 4, according to the detection result of the frequency detection module 63.

Figure 23:
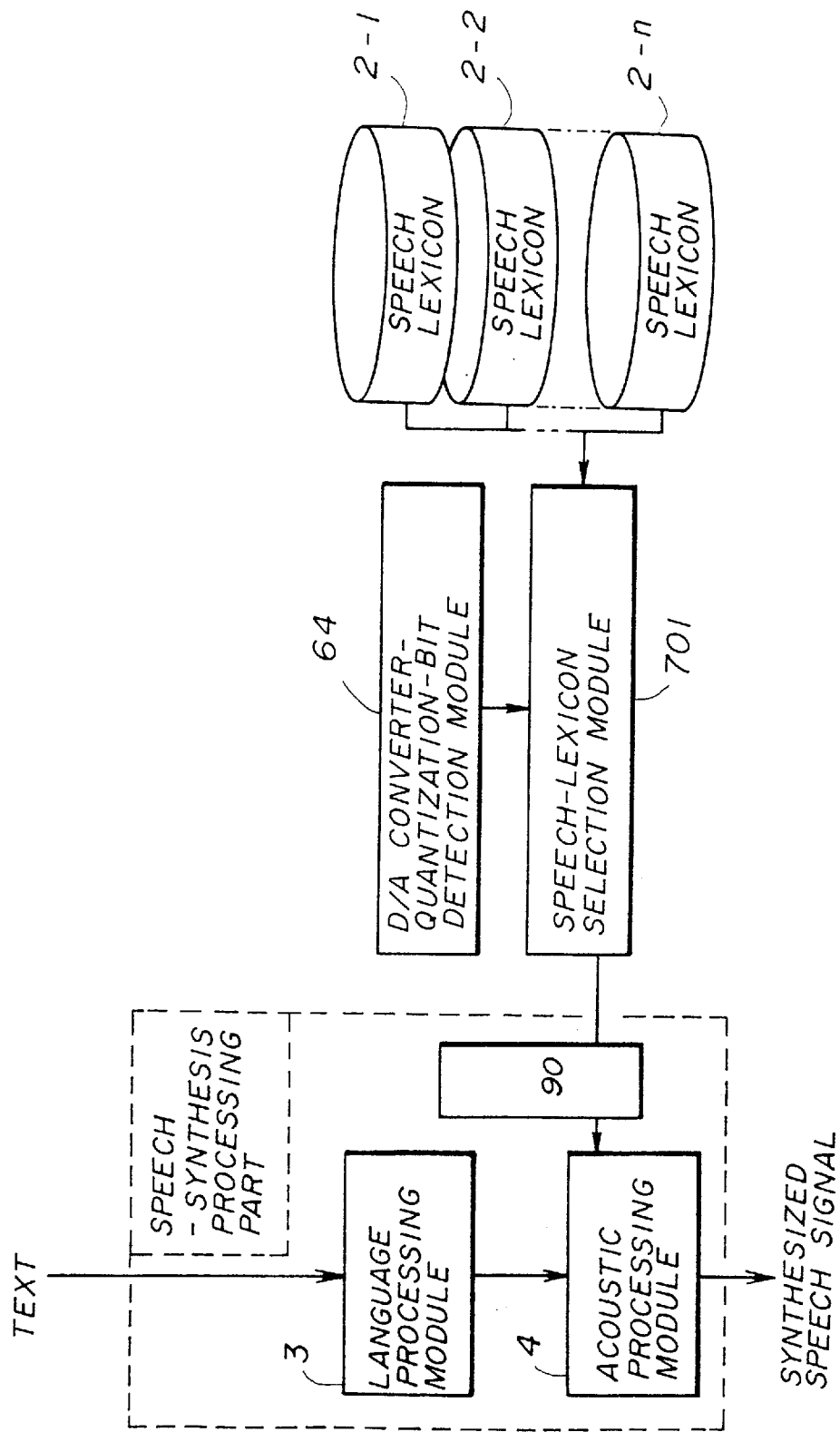
FIGS. 23 and 24 show examples of configurations of the speech synthesis system in a case that a D/A-converter-quantization-bit detection module 64 is used in the detection module 6 in FIG. 2.
Figure 24:
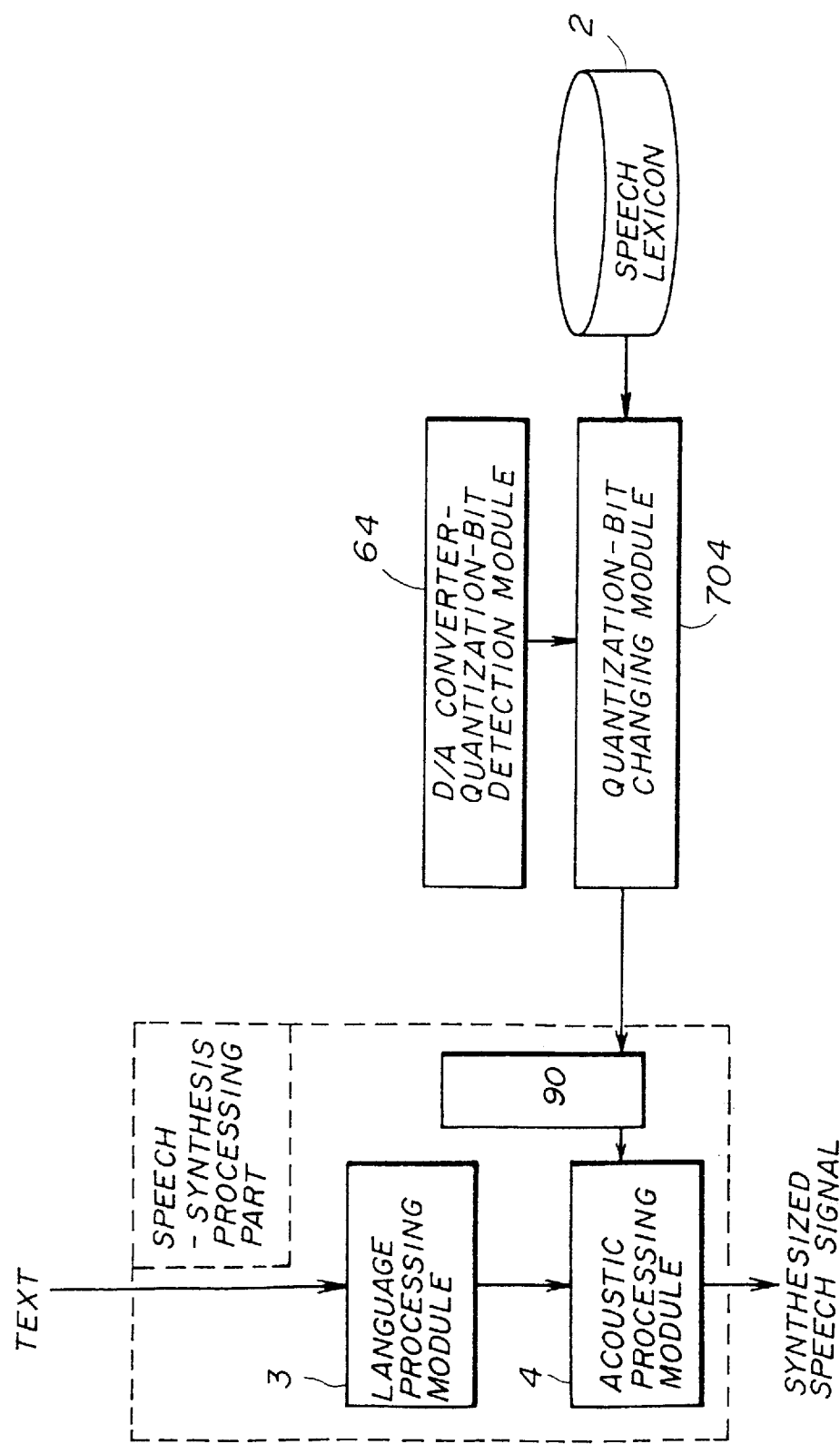

Next, descriptions will be given of still other embodiments of the speech synthesis system according to the present invention, by referring to FIGS. 23 and 24. FIGS. 23 and 24 show examples of configurations of the speech synthesis system in the case that a D/A-converter-quantization-bit detection module 64 is used in the detection module 6. This bit detection module 64 detects the number of the quantization bits of the D/A converter 5 by for example querying to the operating system.

In the embodiment of FIG. 23, the system includes the plurality of speech lexicons 2-i (i=1 to n) which manage the speech data having the different numbers of the quantization bits. And the adjustment module 7 consists of the speech-lexicon selection module 701.

In the embodiment of FIG. 23 constructed in such a structure, once the bit detection module 64 detects the number of the quantization bits of the D/A converter 5, the speech-lexicon selection module 701 reads out, according to the detection result, the associated speech data from the speech lexicon 2-i which manages the speech data having the detected number of the quantization bits. And the speech data read out is stored in the speech-data buffer 90.

Thus, in the embodiment of FIG. 23, by means of changing the number of the quantization bits of the speech data stored in the speech-data buffer 90 to a number adjustable for the D/A converter 5, the speech-synthesis processing suitable for the D/A converter 5 may be realized.

On the other hand, in the embodiment of FIG. 24, the system includes the single speech lexicon 2 which manages the speech data having the large number of quantization bits, for example 16, bits. The adjustment module 7 consists of the quantization-bit changing module 704.

In the embodiment of FIG. 24, once the bit detection module 64 detects the number of the quantization bits of the D/A converter 5, the quantization-bit changing module 704 receives the detection result, and derives the speech data from the speech lexicon 2 to store it in the speech-data buffer 90 in the suitable number of the quantization bits. For example, when the number of the quantization bits of the D/A converter 5 is 16 bits, the quantization-bit changing module 704 reads out directly the speech data stored in the speech lexicon 2, and stores it in the speech-data buffer 90. When the number of the quantization bits of the D/A converter 5 is 8 bits, the quantization-bit changing module 704 reads out the speech data stored in the speech lexicon 2, changes it to 8-bit quantization, and stores it in the speech-data buffer 90.

Thus, in the embodiment of FIG. 24, by means of changing the number of the quantization bits of the speech data stored in the speech-data buffer 90 to the number adjustable for the D/A converter 5, the speech-synthesis processing suitable for the D/A converter 5 may be realized.

As described above, in the embodiments of FIGS. 23 and 24, the speech-synthesis processing suitable for the D/A converter 5 may be realized by adjusting the number of the quantization bits of the speech data directed to the acoustic processing module 4, according to the detection result of the bit detection module 64.

In the embodiments of FIGS. 4 to 24, the detection module 6 includes one of the CPU-function detection module 60, the memory-function detection module 61, the second-order-storage-device-function detection module 62, the D/A-converter-sampling-frequency detection module 63, and the D/A-converter-quantization-bit detection module 64. And based on the detection result, this system changes the sampling frequency or the number of the quantization bits of the speech data stored in the speech-data buffer 90, or changes the amount of the word information stored in the word-information buffer 80.

Furthermore, this speech synthesis system may be also constructed with a plurality of the detection modules, or with a combination of the changes of the sampling frequency and the number of the quantization bits of the speech data.

Next, descriptions will be given of other embodiments of the speech synthesis system having such configurations, by referring to FIGS. 25 to 28. FIGS. 25 to 28 show examples of configurations of the speech synthesis system in the case of having the plurality of the detection modules.

Figure 25:
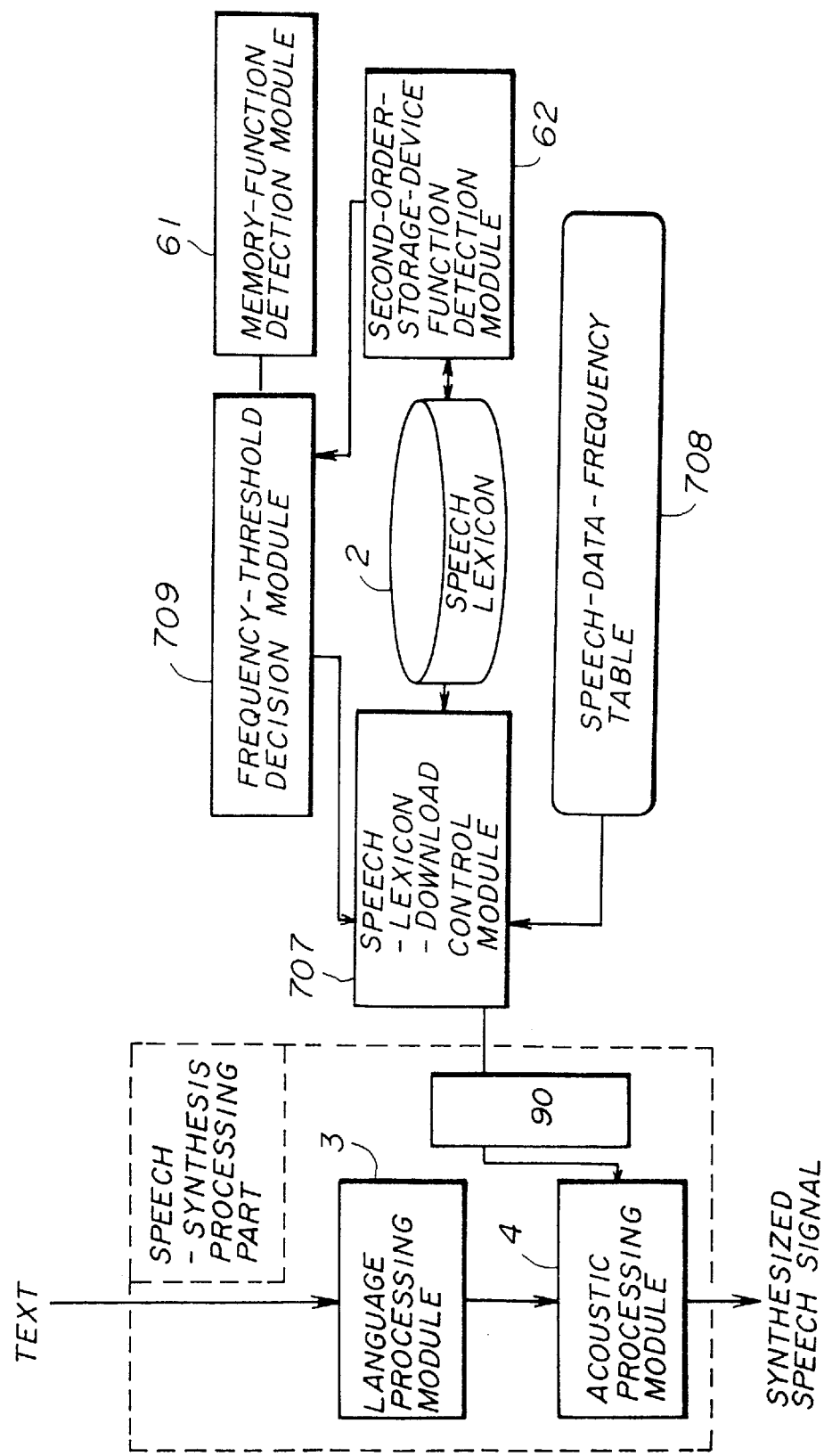
FIGS. 25 to 28 show examples of configurations of the speech synthesis system in a case of having a plurality of the detection modules.

In the embodiment of FIG. 25, the detection module 6 comprises the memory-function detection module 61, and the second-order-storage-device-function detection module 62. And the adjustment module 7 comprises the speech-lexicon-download control module 707, the speech-data-frequency table 708, and the frequency-threshold decision module 709.

In the embodiment of FIG. 25 constructed in such a structure, the frequency-threshold decision module 709 selects the threshold level of the frequency of use of the speech data based on the detection results of the memory-function detection module 61 and the device-function detection module 62. For example, when the good access performance is obtained in the second-order storage device, there is no need of reading out a large amount of the speech data to the speech-data buffer 90, however, at that time if there is the sufficient memory capacity, the threshold of the frequency of use is selected to be the small value to read out the large amount of the speech data. As described above, with taking into account the detection results of the two detection modules, the threshold of the frequency of use of the speech data is selected.

And subsequently, the speech-lexicon-download control module 707 receives the selection result of the frequency-threshold decision module 709, and reads out the speech data which indicates the larger frequency of use than the selected frequency threshold, from the speech lexicon 2, based on the management data of the speech-data-frequency table 708. The speech data read out is stored in the speech-data buffer 90.

Figure 26:
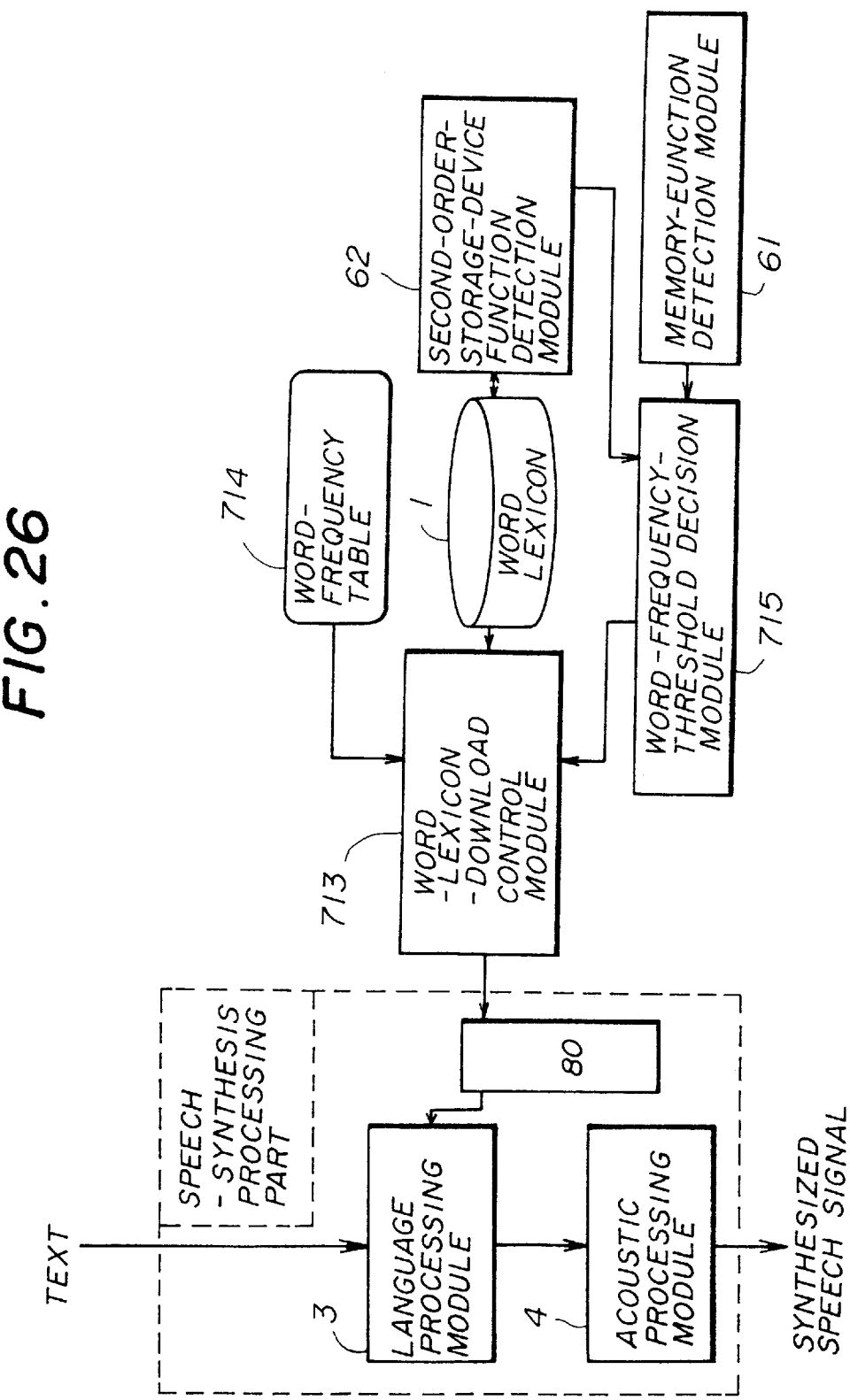

In the embodiment of FIG. 26, the detection module 6 comprises the memory-function detection module 61, and the second-order-storage-device-function detection module 62. And the adjustment module 7 comprises the word-lexicon-download control module 713, the word-frequency table 714, and the word-frequency-threshold decision module 715.

In the embodiment of FIG. 26 constructed in such a structure, the word-frequency-threshold decision module 715 selects the threshold level of the frequency of use of the word information based on the detection results of the memory-function detection module 61 and the device-function detection module 62. For example, when the good access performance is not obtained in the second-order storage device, and there is the sufficient memory capacity, the threshold of the frequency of use is selected to be an extremely small value to allow the reading out of the speech data to be as large as possible. As described above, by taking into account the detection results of the two detection modules, the threshold of the frequency of use of the word information is selected.

And subsequently, the word-lexicon-download control module 713 receives the selection result of the word-frequency-threshold decision module 715, and reads out the word information which indicates the larger frequency of use than the selected frequency threshold, from the word lexicon 1, based on the management data of the word-frequency table 714. The word information read out is stored in the word-information buffer 80.

Figure 27:
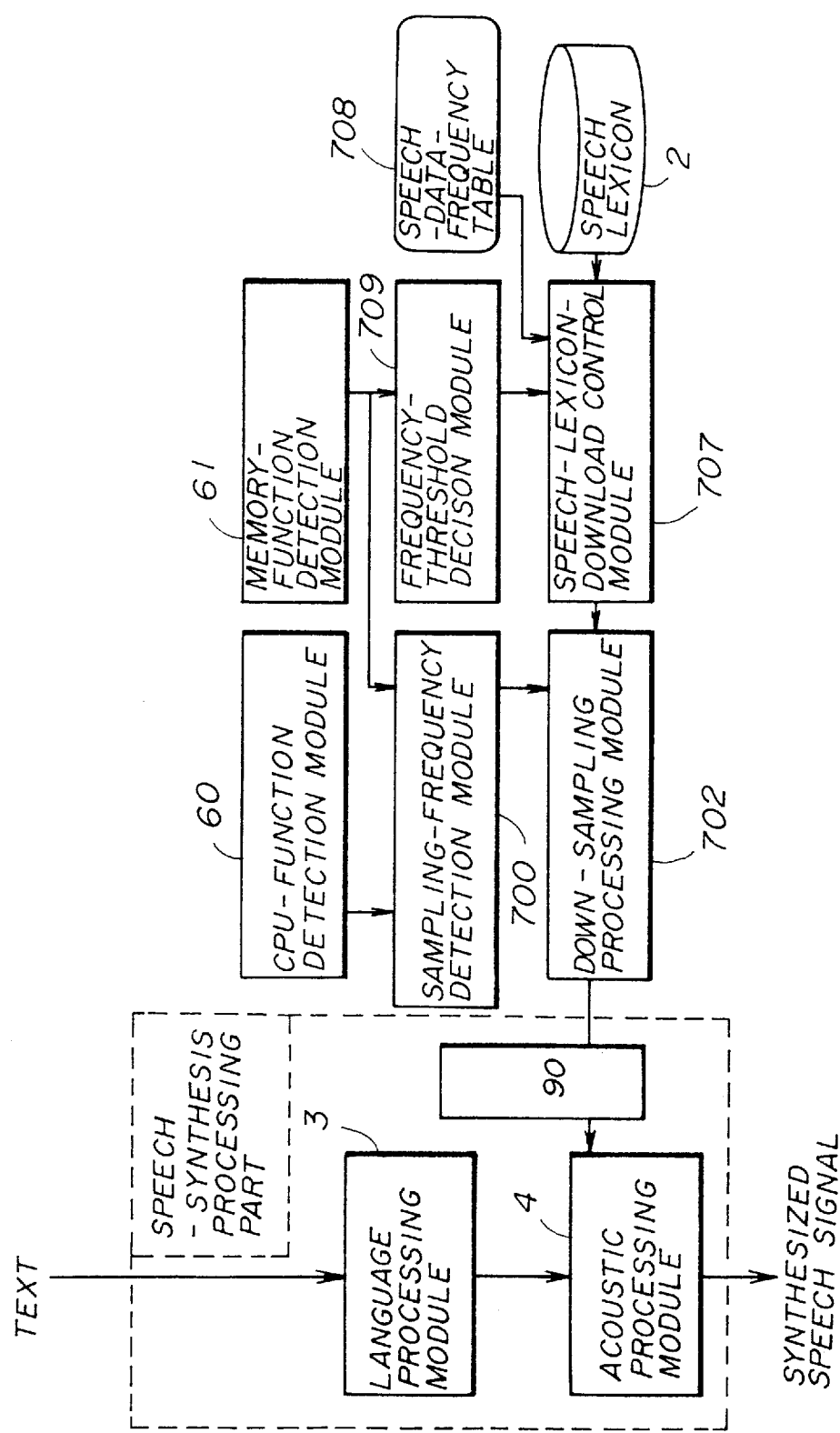

In the embodiment of FIG. 27, the detection module 6 comprises the CPU-function detection module 60, and the memory-function detection module 61. And the adjustment module 7 comprises the sampling-frequency decision module 700, the down-sampling processing module 702, the speech-lexicon-download control module 707, the speech-data-frequency table 708, and the frequency-threshold decision module 709.

In the embodiment of FIG. 27 constructed in such a structure, the frequency-threshold decision module 709 selects the threshold level of the frequency of use of the speech data based on the detection result of the memory-function detection module 61. And in response to the decision result, the speech-lexicon-download control module 707 reads out the speech data which indicates the larger frequency of use than the decided frequency threshold, from the speech lexicon 2, based on the management data of the speech-data-frequency table 708.

Further, the sampling-frequency decision module 700 selects the sampling frequency of the speech data based on the detection result of the CPU-function detection module 60 and the memory-function detection module 61. And in response to the selection result, the down-sampling processing module 702 down-samples the speech data which is read out by the speech-lexicon-download control module 707 to the selected sampling frequency. The down-sampled speech data is stored in the speech-data buffer 90.

Figure 28:
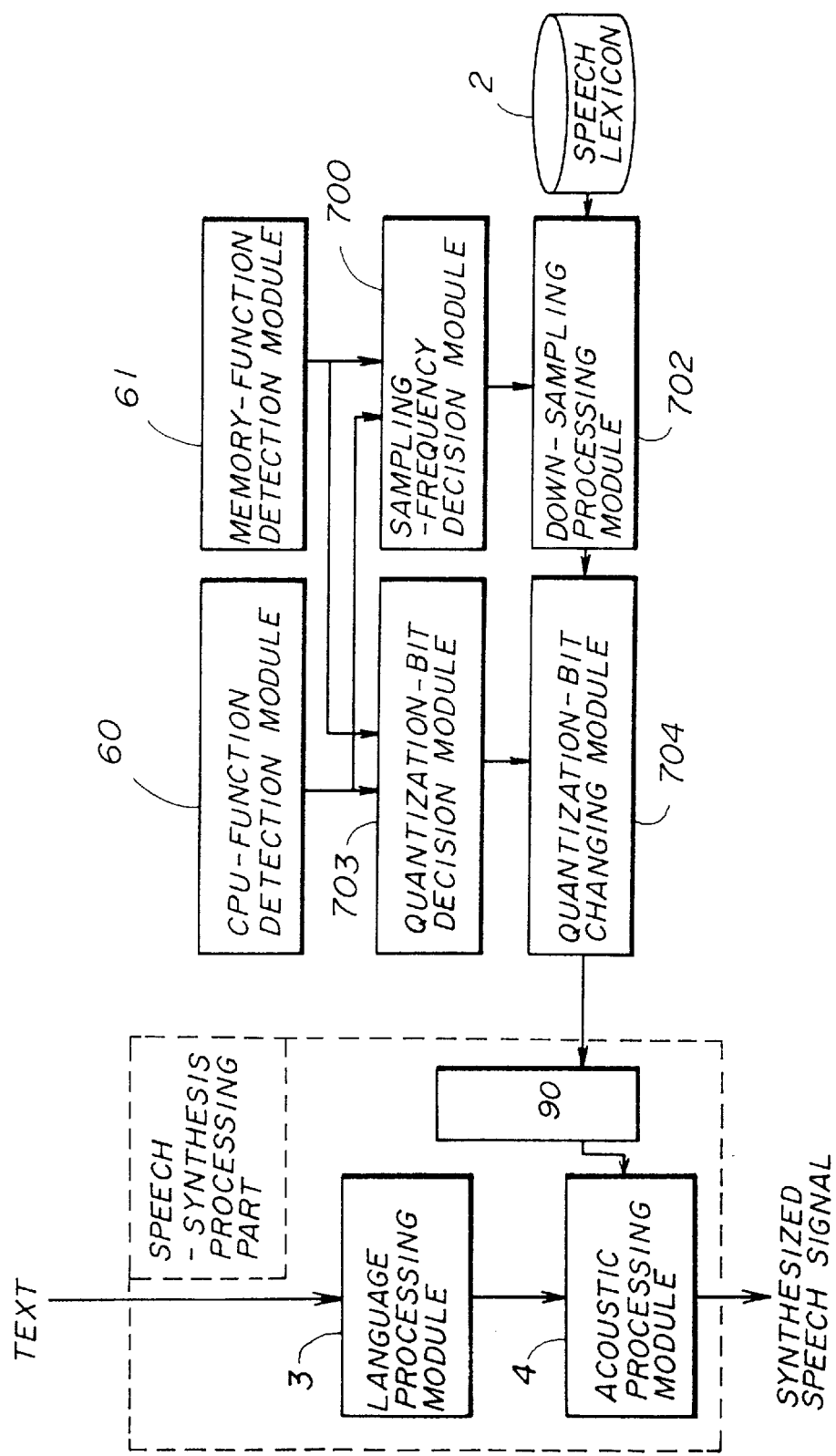

In the embodiment of FIG. 28, the detection module 6 comprises the CPU-function detection module 60, and the memory-function detection module 61. And the adjustment module 7 comprises the sampling-frequency decision module 700, the down-sampling processing module 702, the quantization-bit decision module 703, and the quantization-bit changing module 704.

In the embodiment of FIG. 28 constructed in such a structure, the sampling-frequency decision module 700 selects the sampling frequency of the speech data based on the detection results of the CPU-function detection module 60 and the memory-function detection module 61. And in response to the selection result, the down-sampling processing module 702 down-samples the speech data which is read out by the speech lexicon 2 to the selected sampling frequency.

Further, the quantization-bit decision module 703 decides the number of the quantization bits of the speech data based on the detection results of the CPU-function detection module 60 and the memory-function detection module 61. And in response to the selection result, the quantization-bit changing module 704 changes the number of the quantization bits of the speech data which is read out by the down-sampling processing module 702 to the selected number of the quantization bits. The speech data for which the number of the quantization bits has been changed is stored in the speech-data buffer 90.

In this way, in the present invention, the detection module 6 includes the combinations of the CPU-function detection module 60, the memory-function detection module 61, and the second-order-storage-device-function detection module 62. Therefore, based on the detection results of these detection modules, in this system, the speech data to be stored in the speech-data buffer 90 is adjustable, and the word information to be stored in the word-information buffer 80 is adjustable.

At this time, when the sampling frequency of the speech data stored in the speech-data buffer 90 is not identical to the sampling frequency of the D/A converter 5, the sampling frequency of the synthesized speech signal generated in the acoustic processing module 4 also will not identical to the sampling frequency of the D/A converter 5. And when the number of the quantization bits of the speech data stored in the buffer 90 is not identical to the number of the quantization bits of the D/A converter 5, the number of the quantization bits of the synthesized signal generated in the acoustic processing module 4 also will not identical to the number of the quantization bits of the D/A converter 5.

As previously described in FIG. 2, once the bit adjustment module 7a detects mismatch in the number of the quantization bits based on the detection result of the bit detection module 64, the number of the quantization bits of the synthesized speech signal generated in the acoustic processing module 4 is adjusted to equal that of the D/A converter 5 by shifting bit data of the synthesized speech signal.

And in the embodiment in FIG. 2, once the frequency adjustment module 7b detects mismatch in the sampling frequency based on the detection result of the frequency detection module 63, the sampling frequency of the synthesized speech signal generated in the acoustic processing module 4 is adjusted to equal that of the D/A converter 5 by sampling the bit data of the synthesized speech signal.

The speech synthesis system according to the present invention is characterized in that inner parameters necessary for the speech-synthesis processing are adjustable to be adapted to the hardware performance of the computer in which the software of the system is run. In the embodiments described above, to realize such features, the configurations with the detection module 6 have been represented. However, the present invention is not limited to such configurations, the system may be realized with another configuration with the setting module according to the present invention, by which the user can set performance or conditions of the hardware part of a computer with the dialogic processing between the user and the computer.

Figure 29:
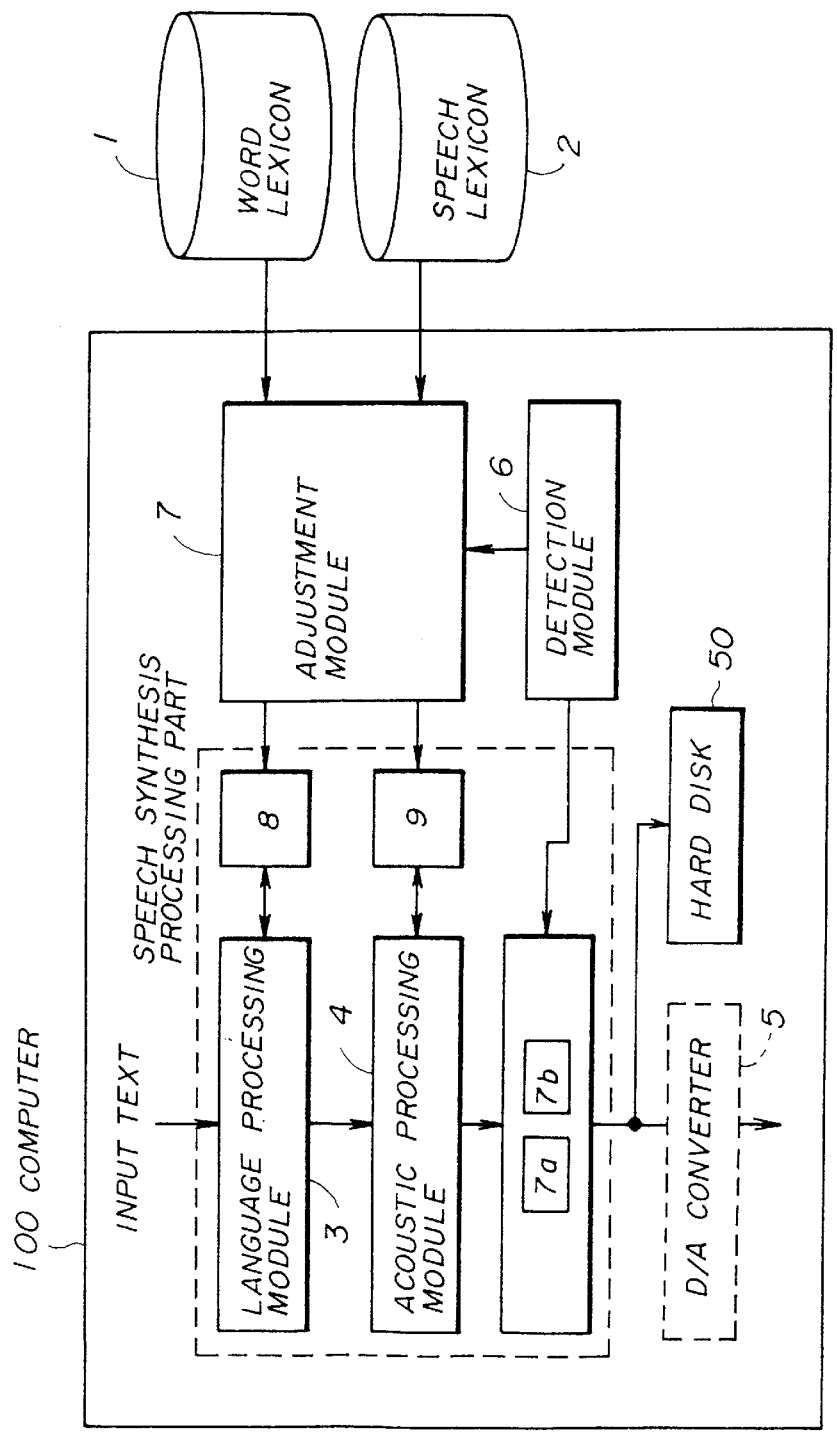
FIG. 29 shows an example of a configuration of the speech synthesis system in a case of having no D/A converter.

In the speech synthesis system, for producing the audible analog signal, the D/A converter is required in the computer. However, the user's computer is not always equipped with the D/A converter. In this case, in the speech synthesis system according to the present invention, if the detection module 6 detects that the D/A converter is not installed in the computer or is not available as shown in FIG. 29, data of the synthesized speech signal generated in the acoustic processing module 4 is adjusted by the adjustment modules 7a and 7b, and is stored as a data file in a storage device such as a hard disk 50. When there are not the adjustment modules 7a and 7b in the system, the synthesized speech signal generated in the acoustic processing module 4 directly passes to the storage device. And if the data file is transmitted to another computer in which the D/A converter is installed for the speech synthesis system, and is passed to the D/A converter in an appropriate manner, the audible analog signal of synthesized speech signal may be produced.

Figure 30:
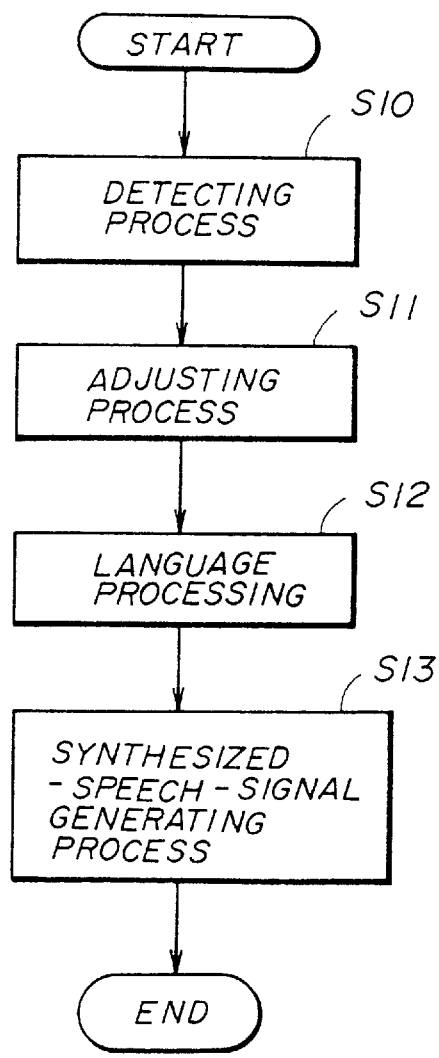
FIG. 30 shows a basic procedure of the speech synthesizing method according to the present invention.

Next, descriptions will be given of procedures of the speech synthesizing methods, by referring to FIGS. 30 to 32. FIG. 30 shows a basic procedure of the speech synthesizing method according to the present invention.

First, in a step S10, the performance or conditions of the hardware part of the computer in which the speech synthesis system is constructed, is detected.

Second, in a step S11, based on the detection result of the performance or the conditions in the step S10, word information which is derived from a word lexicon is adjusted, and is given to the language processing module. And speech data which is derived from a speech lexicon is also adjusted, and is given to the acoustic processing module.

Third, in a step S12, language processing for speech synthesis of the input text is performed by using adjusted word information in the step S11.

Finally, in a step S13, the synthesized speech signal of the input text is generated by using adjusted speech data, in response to the result of the language processing in the step S12.

The synthesized speech data generated in the step S13, when this speech synthesizing method is installed in the computer equipped with the D/A converter, may be converted to the audible analog signal by the D/A converter.

Figure 31:
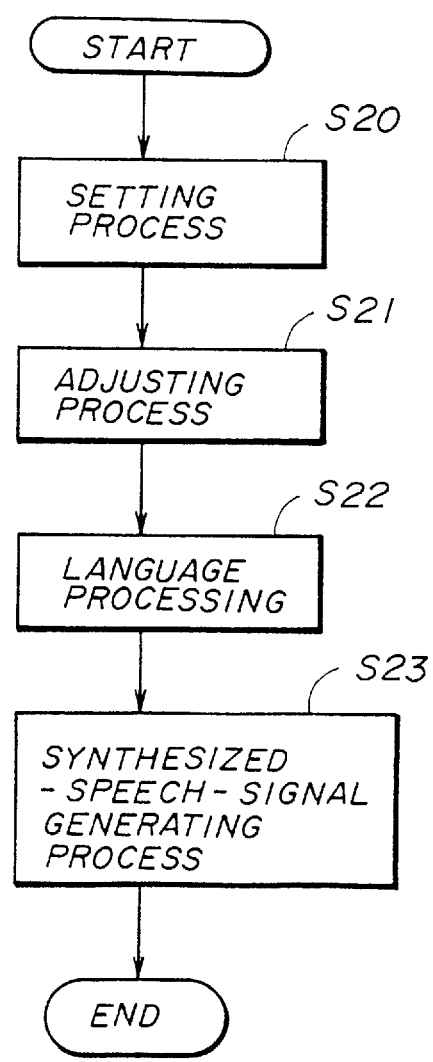
FIG. 31 shows another basic procedure of the speech synthesizing method according to the present invention.

FIG. 31 shows another basic procedure of the speech synthesizing method according to the present invention.

First, in a step S20, performance or conditions of the hardware part of the computer in which the speech synthesis system is constructed, is set by the user with the dialogic processing between the user and the computer.

Second, in a step S21, based on the setting result of the performance or the conditions in the step S20, word information which is derived from a word lexicon is adjusted, and is given to the language processing module. And speech data which is derived from a speech lexicon is also adjusted, and is given to the acoustic processing module.

Third, in a step S22, language processing for speech synthesis of the input text is performed by using adjusted word information in the step S21.

Finally, in a step S23, the synthesized speech signal of the input text is generated by using adjusted speech data, in response to the result of the language processing in the step S22.

The synthesized speech data generated in the step S23, when this speech synthesizing method is installed in the computer equipped with the D/A converter, may be converted to the audible analog signal by the D/A converter.

FIG. 32 shows an example of the procedure embodiment of the speech synthesizing method according to the present invention.

First, in a step S30, the CPU performance is detected from the CPU information which the operating system has, or the CPU performance is discriminated by running a bench-mark program.

Second, in a step S31, the sampling frequency is selected based on the CPU performance detected in the step S30.

Third, in a step S32, the speech lexicon associated with the selected sampling frequency in the step S31 is selected.

Forth, in a step S33, the speech data in the selected speech lexicon in the step S32 is downloaded to the memory.

Fifth, in a step S34, language processing for speech synthesis of the input text is performed by using the word information.

Finally, in a step S35, the synthesized speech signal of the input text is generated by using a downloaded speech data in the memory, in response to the result of the language processing in the step S34.

The synthesized speech data generated in the step S35, when this speech synthesizing method is installed in the computer equipped with the D/A converter, may be converted to the audible analog signal by the D/A converter.

FIG. 33 shows another example of the procedure embodiment of the speech synthesizing method according to the present invention.

First, in a step S40, the memory capacity is detected from the memory information which the operating system has.

Second, in a step S41, the word-lexicon index associated with the detected memory capacity is selected based on the memory capacity detected in the step S40.

Third, in a step S42, the word information which is indicated by the selected word-lexicon index in the step S41 is downloaded to the memory.

Fourth, in a step S43, language processing for speech synthesis of the input text is performed by using the word information downloaded in the step S42.

Finally, in a step S44, the synthesized speech signal of the input text is generated by using the speech data, in response to the result of the language processing in the step S43.

The synthesized speech data generated in the step S44, when this speech synthesizing method is installed in the computer equipped with the D/A converter, may be converted to the audible analog signal by the D/A converter.

As has already been stated, the speech synthesis system may be constructed with the software except the D/A converter. Therefore, the modules constructing the speech synthesis system according to the present invention indicates the modules of the software. And each step of the speech synthesizing method may be performed by running the software. The spirit and scope of this invention exists not only in the hardware in which the software is installed, but also in any storage device in which the software may be stored. Thus, the storage device such as a floppy disk, or the CD-ROM, in which the software for the speech synthesis system is stored, is also covered by the present invention.

According to the speech synthesis system, according to the hardware performance or conditions detected in the detection module, the word information directed to the language processing module is adjusted, and the number of the quantization bits, the sampling frequency, and the amount of supply of the speech data directed to the acoustic processing module are adjusted.

By such adjustment, with the computer having high hardware performance, the language processing module and the acoustic processing module may perform superior speech-synthesis processing, and with the computer having poor hardware performance, these modules may perform optimum speech-synthesis processing in the range of that hardware performance.

In this way, according to the speech synthesis system, the speech-synthesis processing suitable for any computer in which its software is run, may be realized. Thus, the user may construct good speech synthesis system with the computer which has been used by the user.

Further, the present invention is not limited to these embodiments, but various variations and modifications may be made without departing from the scope of the present invention.

What is claimed is:

1. A speech synthesis system having a word lexicon stored in a storage device for managing word information, a speech lexicon stored in the storage device for managing speech data, a language processing module carrying out language processing of an input text by using said word information, an acoustic processing module generating a synthesized speech signal by using said speech data in response to a processing result of the language processing module, and a D/A converter converting the synthesized speech signal to an analog signal, the system comprising:

a detection module detecting, before inputting of the input text to be speech-synthesized and without depending thereupon, at least one of performance and conditions of a hardware part of a computer in which said speech synthesis system is implemented; and an adjustment module adjusting at least one of said word information and said speech data to be given to said language processing module and said acoustic processing module, based on a detection result of said detection module to make speech-synthesis processing suitable for detected computer hardware conditions.

2. The speech synthesis system as claimed in claim 1, wherein said detection module comprises a portion or a whole of:

a CPU-function detection module detecting CPU performance or CPU load;

a memory-function detection module detecting a memory capacity or a memory-using situation;

a storage-device-function detection module detecting access performance of said storage device; and a D/A-converter-function detection module detecting D/A converting performance of said D/A converter.

3. The speech synthesis system as claimed in claim 1, further comprising a bit adjustment module adjusting bit data of said synthesized speech signal generated in said acoustic processing module according to a number of quantization bits of said D/A converter detected by a D/A-converter-function detection module, when the number of the quantization bits of the D/A converter is not identical to a number of quantization bits of the synthesized speech signal generated in the acoustic processing module.

4. The speech synthesis system as claimed in claim 2, further comprising a bit adjustment module adjusting bit data of said synthesized speech signal generated in said acoustic processing module according to a number of quantization bits of said D/A converter detected by said D/A-converter-function detection module, when the number of the quantization bits of the D/A converter is not identical to a number of quantization bits of the synthesized speech signal generated in the acoustic processing module.

5. The speech synthesis system as claimed in claim 1, further comprising a frequency adjustment module adjusting a sampling frequency of said synthesized speech signal generated in said acoustic processing module according to a sampling frequency of said D/A converter detected by a D/A-converter-function detection module, when the sampling frequency of the D/A converter is not identical to a sampling frequency of the synthesized speech signal generated in the acoustic processing module.

6. The speech synthesis system as claimed in claim 2, further comprising a frequency adjustment module adjusting a sampling frequency of said synthesized speech signal generated in said acoustic processing module according to a sampling frequency of said D/A converter detected by said D/A-converter-function detection module, when the sampling frequency of the D/A converter is not identical to a sampling frequency of the synthesized speech signal generated in the acoustic processing module.

7. The speech synthesis system as claimed in claim 1, wherein said adjustment module adjusts said word information for said language processing module by adjusting an amount of supply of the word information.

8. The speech synthesis system as claimed in claim 7, wherein said adjustment module determines said word information in the word lexicon by selecting between one of a plurality of word lexicons and a word appearance frequency, and supplies selected word information to the language processing module.

9. The speech synthesis system as claimed in claim 1, wherein said adjustment module adjusts the speech data for said acoustic processing module, by using means of adjusting a number of quantization bits of the speech data, adjusting a sampling frequency of the speech data, adjusting an amount of supply of the speech data, or combinations thereof.

10. The speech synthesis system as claimed in claim 9, wherein said adjustment module, when the number of the quantization bits of the speech data is adjusted, selects, in the case that a plurality of speech lexicons are prepared with relation to different numbers of the quantization bits, one of the plurality of speech lexicons, speech data in a selected speech lexicon being directed to said acoustic processing module, or compresses or extends, in the case that only one speech lexicon is prepared, the speech data in the speech lexicon, compressed or extended speech data being directed to the acoustic processing module.

11. The speech synthesis system as claimed in claim 9, wherein said adjustment module, when the sampling frequency of the speech data is adjusted, selects, in the case that a plurality of speech lexicons are prepared with relation to different sampling frequencies, one of the plurality of speech lexicons, speech data in a selected speech lexicon being directed to said acoustic processing module, or samples, in the case that only one speech lexicon is prepared, the speech data in the speech lexicon in a high or a low frequency, the sampled speech data being directed to the acoustic processing module.

12. The speech synthesis system as claimed in claim 9, wherein said adjustment module, when the amount of supply of the speech data is adjusted, determines the speech data in the speech lexicon by selecting between one of a plurality of speech lexicons and a word appearance frequency, the selected speech data being directed to the acoustic processing module.

13. The speech synthesis system as claimed in claim 9, wherein said adjustment module, when the amount of supply of the speech data is adjusted, selects, in the case that a plurality of speech lexicons are prepared with relation to different tones, one or a plurality of the speech lexicons, the speech data in the selected speech lexicon being directed to the acoustic processing module.

14. A speech synthesis system having a word lexicon and speech lexicon stored in a storage device, the word lexicon managing word information and the speech lexicon managing speech data, a language processing module carrying out language processing of an input text by using said word information, an acoustic processing module generating a synthesized speech signal by using said speech data in response to a processing result of the language processing module, and a D/A converter converting the synthesized speech signal to an analog signal, the system comprising:

a setting module by which a user can set at least one of performance and conditions of a hardware part of a computer in which said system is implemented, by a dialogic processing between the user and the computer, before inputting of the input text to be speech-synthesized and without depending thereupon; and an adjustment module adjusting at least one of said word information and said speech data to be given to said language processing module and said acoustic processing module, based on a setting result of said setting module used in speech-synthesis processing that is suitable for detected computer hardware conditions.

15. The speech synthesis system as claimed in claim 14, further comprising a bit adjustment module adjusting bit data of said synthesized speech signal generated in said acoustic processing module according to a number of quantization bits of said D/A converter set by said setting module, when the number of the quantization bits of the D/A converter is not identical to a number of quantization bits of the synthesized speech signal generated in the acoustic processing module.

16. The speech synthesis system as claimed in claim 14, further comprising a frequency adjustment module adjusting a sampling frequency of said synthesized speech signal generated in said acoustic processing module according to a sampling frequency of said D/A converter set by said setting module, when the sampling frequency of the D/A converter is not identical to a sampling frequency of the synthesized speech signal generated in the acoustic processing module.

17. The speech synthesis system as claimed in claim 14, wherein said adjustment module adjusts said word information for said language processing module by adjusting an amount of supply of the word information.

18. The speech synthesis system as claimed in claim 17, wherein said adjustment module determines the word information in the word lexicon by selecting between one of a plurality of word lexicons and a word appearance frequency, and gives selected word information to said language processing module.

19. The speech synthesis system as claimed in claim 14, wherein said adjustment module adjusts the speech data for said acoustic processing module, by using means of adjusting a number of quantization bits of the speech data, adjusting a sampling frequency of the speech data, adjusting an amount of supply of the speech data, or combinations thereof.

20. The speech synthesis system as claimed in claim 19, wherein said adjustment module, when the number of the quantization bits of the speech data is adjusted, selects, in a case that a plurality of speech lexicons are prepared with relation to different numbers of the quantization bits, one of the plurality of speech lexicons, speech data in a selected speech lexicon being directed to said acoustic processing module, or compresses or extends, in the case that only one speech lexicon is prepared, the speech data in the speech lexicon, compressed or extended speech data being directed to the acoustic processing module.

21. The speech synthesis system as claimed in claim 19, wherein said adjustment module, when the sampling frequency of the speech data is adjusted, selects, in the case that a plurality of speech lexicons are prepared with relation to different sampling frequencies, one of the plurality of speech lexicons, speech data in a selected speech lexicon being directed to said acoustic processing module, or samples, in the case that only one speech lexicon is prepared, the speech data in the speech lexicon in a high or a low frequency, sampled speech data being directed to the acoustic processing module.

22. The speech synthesis system as claimed in claim 19, wherein said adjustment module, when the amount of supply of the speech data is adjusted, determines the speech data in the speech lexicon according to appearance frequency, selected speech data being directed to the acoustic processing module.

23. The speech synthesis system as claimed in claim 19, wherein said adjustment module, when the amount of supply of the speech data is adjusted, selects, in the case that a plurality of speech lexicons are prepared with relation to different tones, one or a plurality of the speech lexicons, the speech data in a selected speech lexicon being directed to the acoustic processing module.

24. The speech synthesis system as claimed in claim 1, wherein if the detection module detects that said D/A converter is not installed in this system or is not available, data of the synthesized speech signal generated in the acoustic processing module is stored in a storage device.

25. A speech synthesizing method, comprising the steps of:
  (a) detecting, before inputting of an input text to be speech-synthesized and without depending thereupon, at least one of performance and conditions of a hardware part of a computer in which a speech synthesis system is constructed;
  (b) adjusting, based on a detection result of said performance or said conditions, word information which is derived from a word lexicon and is given to a language processing module and speech data which is derived from a speech lexicon and is given to an acoustic processing module;
  (c) performing language processing for speech synthesis of the input text by using adjusted word information; and
  (d) generating a synthesized speech signal of the input text by using adjusted speech data, in response to a result of the language processing.

26. A speech synthesizing method, comprising the steps of:
  (a) setting at least one of performance and conditions of a hardware part of a computer in which a speech synthesis system is constructed, by a dialogic processing between a user and the computer, before inputting of the input text to be speech-synthesized and without depending thereupon;
  (b) adjusting, based on a setting result of said performance or said conditions, word information which is derived from a word lexicon and is given to a language processing module and speech data which is derived from a speech lexicon and is given to an acoustic processing module;
  (c) performing language processing for speech synthesis of an input text by using adjusted word information; and
  (d) generating a synthesized speech signal of the input text by using adjusted speech data, in response to a result of the language processing.

27. A storage medium storing information and data describing a sequence for controlling a speech synthesis system, the storage medium comprising:
  a word lexicon managing word information;
  a speech lexicon managing speech data;
  a language processing module performing language processing for speech synthesis of an input text by using word information of the word lexicon;
  an acoustic processing module generating a synthesized speech signal of the input text by using speech data of the speech lexicon, based on a processing result of the language processing module;
  a detection module detecting, before inputting of the input text to be speech-synthesized and without depending thereupon, at least one of performance and conditions of a hardware part of a computer in which said system is implemented; and
  an adjustment module adjusting lexicon information which is to be given to said language processing module and said acoustic processing module, in response to a detection result of said detection module.

28. A storage medium storing information and data describing a sequence for controlling a speech synthesis system, the storage medium comprising:
  a word lexicon managing word information;
  a speech lexicon managing speech data;
  a language processing module performing language processing for speech synthesis of an input text by using word information of the word lexicon;
  an acoustic processing module generating a synthesized speech signal of the input text by using speech data of the speech lexicon, based on a processing result of the language processing module;
  a setting module by which a user can set at least one of performance and conditions of a hardware part of a computer in which said system is implemented, with a dialogic processing between the user and the computer, before inputting of the input text to be speech-synthesized and without depending thereupon; and
  an adjustment module adjusting lexicon information which is to be given to said language processing module and said acoustic processing module, in response to a setting result of said setting module.

29. A speech synthesis system transforming text into an analog speech signal, comprising:
  a language processing module coupled to an acoustic processing module; and
  an adjustment module varying parameters of the language processing module and the acoustic processing module based on a measurement of hardware conditions, before inputting of the input text to be speech-synthesized and without depending thereupon.

30. The speech synthesis system of claim 29, further comprising a bit adjustment module adjusting bit quantization levels of a D/A converter based on the hardware conditions.

31. The speech synthesis system of claim 29, further comprising a frequency adjustment module adjusting a sampling frequency of a synthesized speech signal generated in the acoustic processing module according to hardware conditions.

32. The speech synthesis system of claim 29, wherein the measurement of hardware conditions is selected from the group consisting essentially of CPU Performance, CPU load, memory capacity, memory-using situation, access performance of a storage device, and D/A converting performance, all independent of data input rate.

33. The speech synthesis system of claim 1, wherein said hardware conditions are detected and said adjustment module adjusted before start of the speech synthesis processing.

34. The speech synthesis system of claim 14, wherein said hardware conditions are set and said adjustment module adjusted before start of the speech synthesis processing.

* * * * *

UNITED STATES PATENT AND TRADEMARK OFFICE
CERTIFICATE OF CORRECTION

PATENT NO. : 5,848,390
DATED : December 8, 1998
INVENTOR(S) : Tatsuro MATSUMOTO

It is certified that error appears in the above-identified patent and that said Letters Patent is hereby corrected as shown below:

On the title page, [73] Assignee, change "Kanagawa" to --Kawasaki--.

On the title page, [56] References Cited, U.S. PATENT DOCUMENTS, insert the following:

| | | |
|---|---|---|
| 4,700,393 | 10/1987 | Masuzawa et al. |
| 4,817,151 | 03/1989 | Kaneko |
| 3,624,301 | 11/1971 | Richeson |

Col. 4,     line 8, change "CPUfunction" to --CPU-function--;
             line 12, change "memoryfunction" to --memory-function--.

Col. 5,     line 39, change "wordinformation" to --word-information--.

Col. 28,    line 56, change "Performance" to --performance--.

Signed and Sealed this

Thirteenth Day of July, 1999

Attest:

Attesting Officer

Q. TODD DICKINSON
Acting Commissioner of Patents and Trademarks